United States Patent
Breslow et al.

(10) Patent No.: US 11,762,828 B2
(45) Date of Patent: Sep. 19, 2023

(54) CUCKOO FILTERS AND CUCKOO HASH TABLES WITH BIASING, COMPRESSION, AND DECOUPLED LOGICAL SPARSITY

(71) Applicant: Advanced Micro Devices, Inc., Santa Clara, CA (US)

(72) Inventors: Alexander D. Breslow, Santa Clara, CA (US); Nuwan S. Jayasena, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 739 days.

(21) Appl. No.: 16/104,662

(22) Filed: Aug. 17, 2018

(65) Prior Publication Data

US 2019/0266252 A1    Aug. 29, 2019

Related U.S. Application Data

(60) Provisional application No. 62/635,783, filed on Feb. 27, 2018.

(51) Int. Cl.
*G06F 16/00* (2019.01)
*G06F 16/22* (2019.01)

(52) U.S. Cl.
CPC .................... *G06F 16/2255* (2019.01)

(58) Field of Classification Search
CPC ...................................... G06F 16/2255
USPC ......................................... 707/747
See application file for complete search history.

(56) References Cited

U.S. PATENT DOCUMENTS

2017/0300592 A1    10/2017  Breslow et al.
2019/0065557 A1*   2/2019   Boles ............... G06F 16/134
                                                707/707

OTHER PUBLICATIONS

Bloom, Burton H. "Space/time trade-offs in hash coding with allowable errors." Communications of the ACM 13.7 (1970): 422-426.
Bonomi, Flavio, et al. "An improved construction for counting bloom filters." European Symposium on Algorithms. Springer, Berlin, Heidelberg, 2006.
Breslow, Alex D., et al. "Horton Tables: Fast Hash Tables for In-Memory Data-Intensive Computing." USENIX Annual Technical Conference. 2016.
Erlingsson, Ulfar, Mark Manasse, and Frank McSherry. "A cool and practical alternative to traditional hash tables." Proc. 7th Workshop on Distributed Data and Structures (WDAS'06). 2006.
Fan, Bin, David G. Andersen, and Michael Kaminsky. "MemC3: Compact and Concurrent MemCache with Dumber Caching and Smarter Hashing." NSDI. vol. 13. 2013.
Fan, Bin, et al. "Cuckoo filter: Practically better than bloom." Proceedings of the 10th ACM International on Conference on emerging Networking Experiments and Technologies. ACM, 2014.

(Continued)

*Primary Examiner* — Alexandria Y Bromell

(57) ABSTRACT

A method includes, for each key of a plurality of keys, identifying from a set of buckets a first bucket for the key based on a first hash function, and identifying from the set of buckets a second bucket for the key based on a second hash function. An entry for the key is stored in a bucket selected from one of the first bucket and the second bucket. The entry is inserted in a sequence of entries in a memory block. A position of the entry in the sequence of entries corresponds to the selected bucket. For each bucket in the set of buckets, an indication of a number of entries in the bucket is recorded.

20 Claims, 14 Drawing Sheets

(56) References Cited

OTHER PUBLICATIONS

Fan, Li, et al. "Summary cache: a scalable wide-area web cache sharing protocol." IEEE/ACM Transactions on Networking (TON) 8.3 (2000): 281-293.
Gonzalez, Rodrigo, et al. "Practical implementation of rank and select queries." Poster Proc. Volume of 4th Workshop on Efficient and Experimental Algorithms (WEA). 2005.
Jacobson, Guy. "Space-efficient static trees and graphs." Foundations of Computer Science, 1989., 30th Annual Symposium on. IEEE, 1989.
Okanohara, Daisuke, and Kunihiko Sadakane. "Practical entropy-compressed rank/select dictionary." Proceedings of the Meeting on Algorithm Engineering & Expermiments. Society for Industrial and Applied Mathematics, 2007.
Pandey, Prashant, et al. "A general-purpose counting filter: Making every bit count." Proceedings of the 2017 ACM International Conference on Management of Data. ACM, 2017.
Ross, Kenneth A. "Efficient hash probes on modern processors." Data Engineering, 2007. ICDE 2007. IEEE 23rd International Conference on. IEEE, 2007.

\* cited by examiner

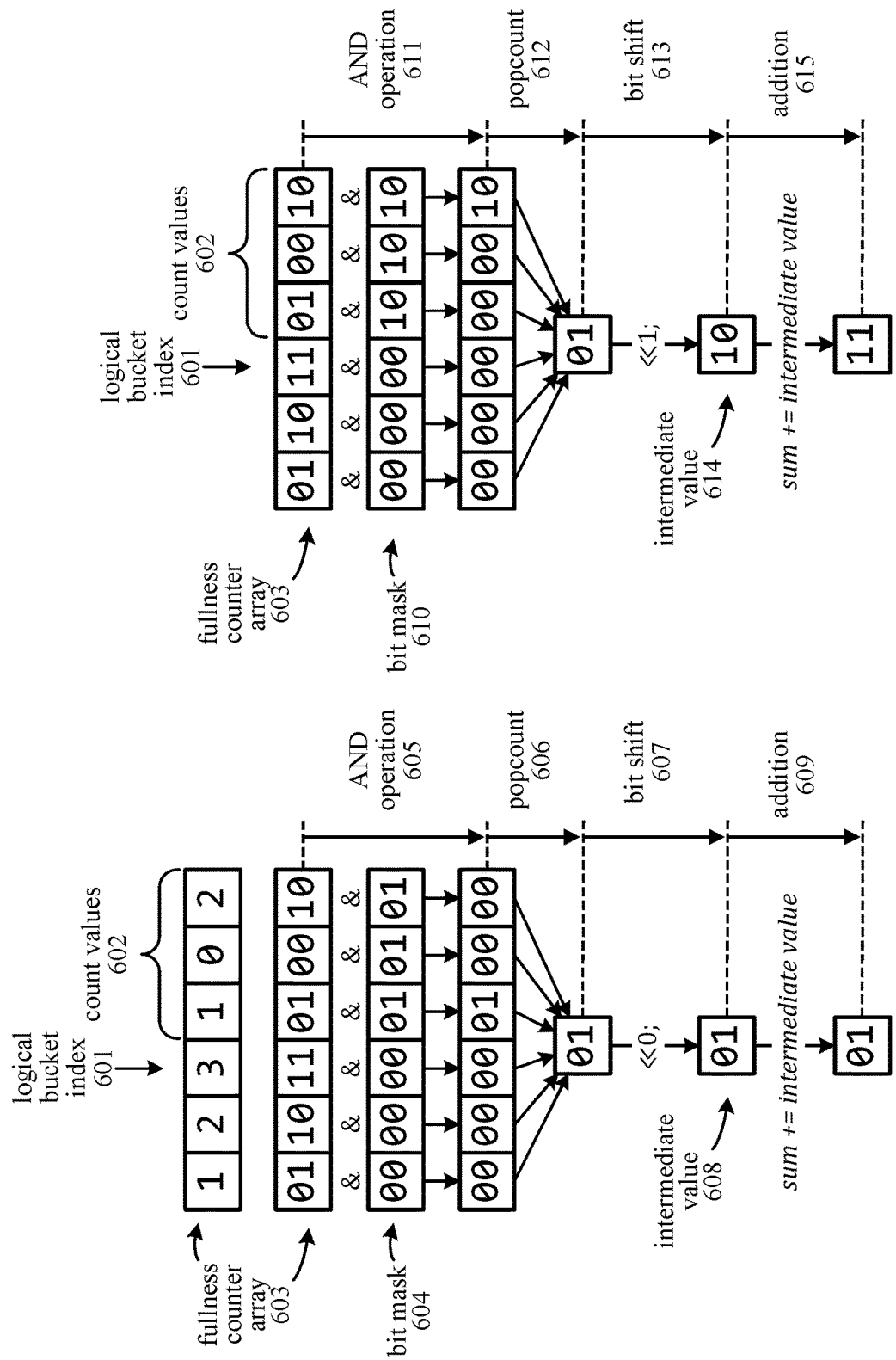

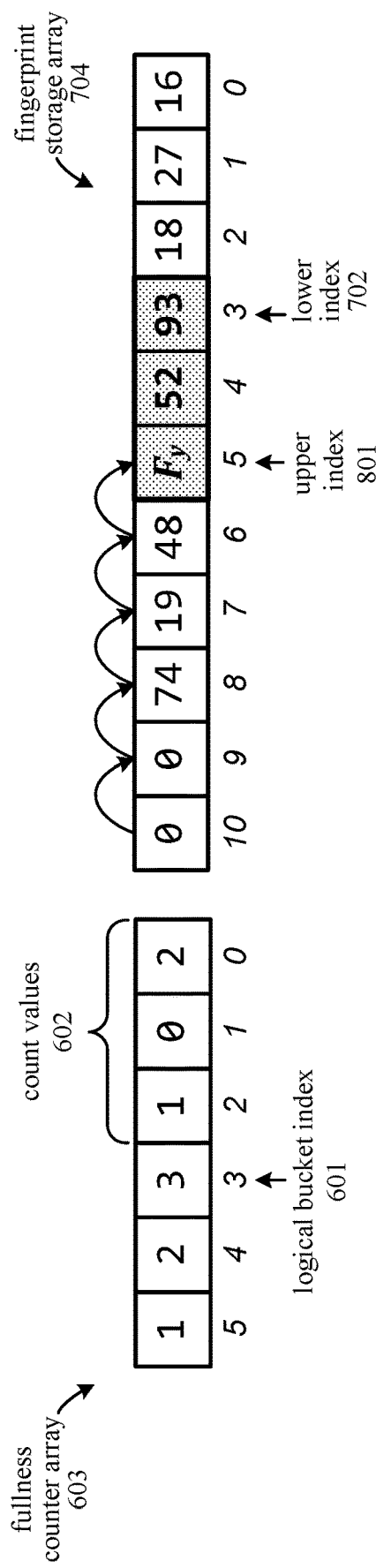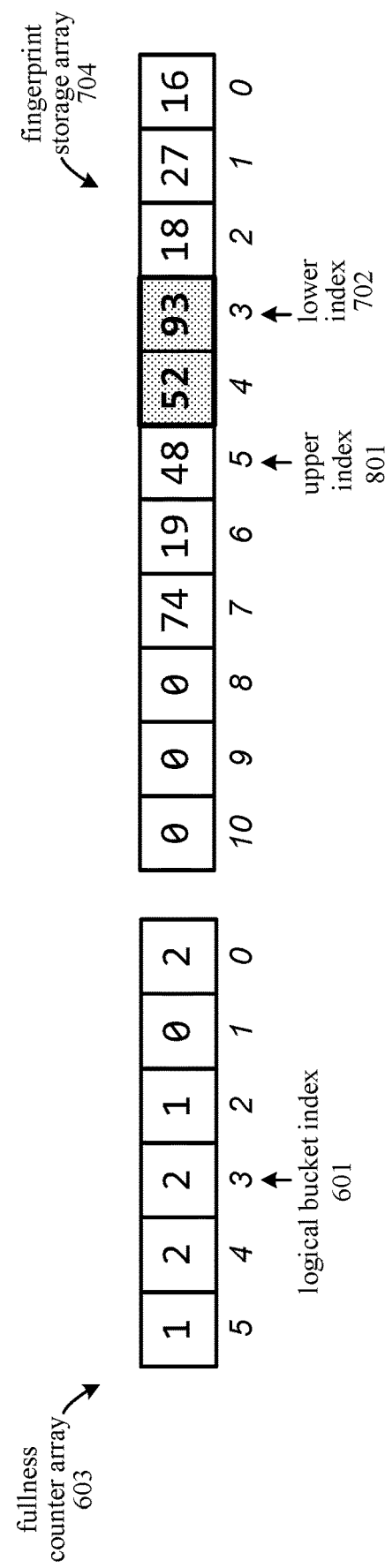
FIGURE 8A
FIGURE 8B

CUCKOO FILTERS AND CUCKOO HASH TABLES WITH BIASING, COMPRESSION, AND DECOUPLED LOGICAL SPARSITY

RELATED APPLICATIONS

This application claims priority to U.S. Provisional Application No. 62/635,783, filed on Feb. 27, 2018, which is incorporated by reference herein in its entirety.

BACKGROUND

Approximate set membership data structures (ASMDS) are deployed in a wide variety of computing applications, including, for example, computer networking, database systems and DNA sequencing systems. They also are commonly employed in computer processors to filter requests when storing an explicit representation of a set would be costly or prohibitively expensive. Similar to a set membership structure, an ASMDS answers set membership queries, confirming or denying the existence of an element in a set. In a typical ASMDS, a key can be added as an element in the set by inserting a hash of the key in the data structure. Subsequently, a hash of a queried key can be calculated and compared with the previously stored hash to determine whether the key is a member of the set. While an explicit set membership structure does not report false positives or false negatives, an ASMDS is able to report false positives (due to hash collision) but does not report false negatives. As such, an ASMDS is able to report whether a queried element is most likely in the set, or definitely not in the set.

The most common ASMDS is the Bloom filter, which in its simplest form supports insertions and lookups, but lacks a deletion operation. Deletions and counting occurrences of elements are supported via a number of different Bloom filter variants, albeit with an increase in the storage cost, where a 2× to 4× increase is not uncommon. The simplest form of Bloom filter also exhibits poor locality of reference, and more cache-friendly blocked variants are typically less space efficient. Alternative ASMDS filters, such as quotient filters and cuckoo filters have been proposed to address the shortcomings of the Bloom filter. These alternative filters support deletions and, when filled to high load factors (e.g., 95% full) use less space than a comparable Bloom filter; however, insertion throughput in these filters can decrease substantially as the filter is filled.

BRIEF DESCRIPTION OF THE DRAWINGS

The present disclosure is illustrated by way of example, and not by way of limitation, in the figures of the accompanying drawings.

FIGS. 6A and 6B illustrate iterations in a process of calculating a lower storage array index of a bucket, according to an embodiment.

FIGS. 8A and 8B illustrate the deletion of a fingerprint entry from a compressed cuckoo filter, according to an embodiment.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A cuckoo filter is an approximate set membership data structure (ASMDS) that is organized as a matrix, in which rows are called buckets and cells within each row are called slots. Each slot can store a single fixed-width hash known as a fingerprint, which encodes the membership of a single item (i.e., a key) within the set. The cuckoo filter is associated with a set of two or more hash functions which are each used to calculate a different bucket index based on a key. Each fingerprint is thus remappable to a fixed number of buckets equal to the number of hash functions in the set.

Figure 1A:
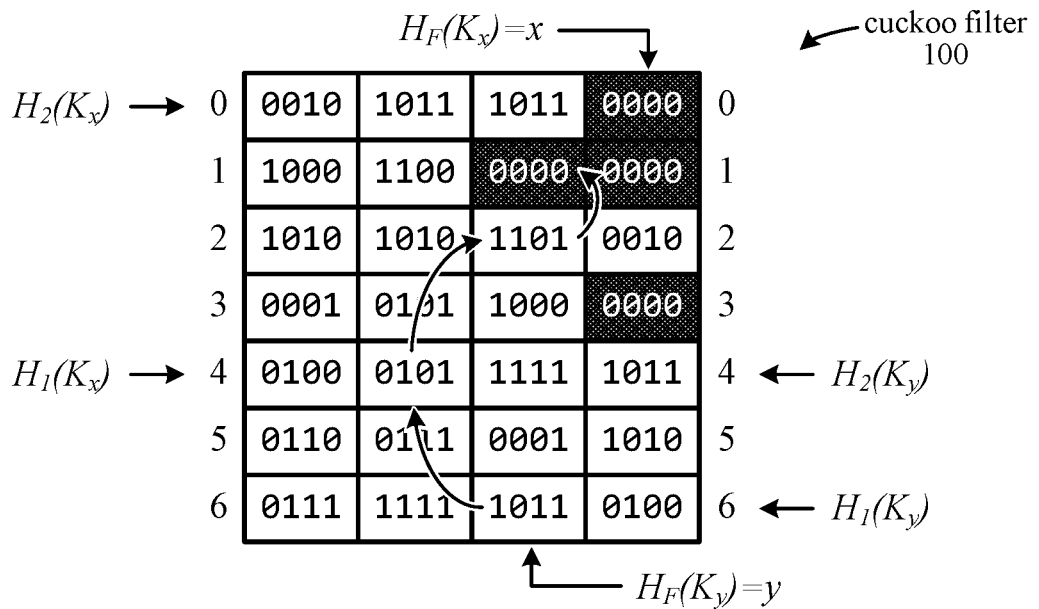
FIGS. 1A and 1B illustrate an embodiment of a cuckoo filter.
Figure 1B:
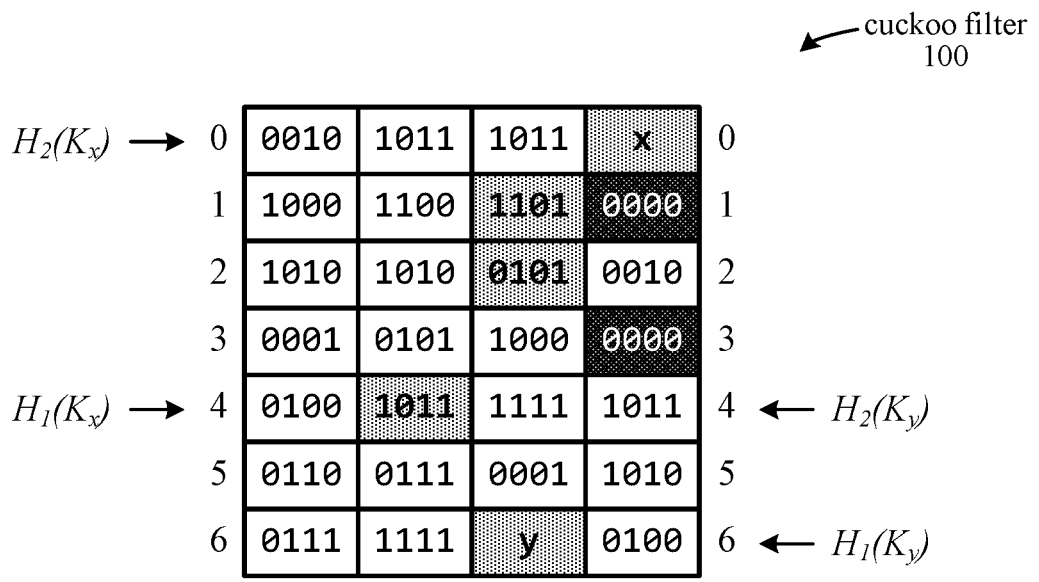

FIGS. 1A and 1B illustrate an embodiment of a cuckoo filter 100 having seven buckets, with four slots in each bucket, and two hash functions $H_1(K)$ and $H_2(K)$ for calculating candidate buckets for a key K. FIGS. 1A and 1B illustrate a process for inserting keys $K_x$ and $K_y$ into the cuckoo filter 100 by inserting each of their respective fingerprints x and y into one of their candidate buckets.

Fingerprint x is calculated from $H_F(K_x)$ (i.e., by executing the hash function $H_F$ on the key $K_x$). The candidate buckets 4 and 0 for $K_x$ are calculated from $H_1(K_x)$ and $H_2(K_x)$, respectively. Of the candidate buckets 4 and 0, bucket 4 is full, while bucket 0 has an empty slot (containing the value '0000'). Therefore, fingerprint x is inserted into the available slot in bucket 0.

For key $K_y$, fingerprint y is calculated from $H_F(K_y)$ and its candidate buckets 6 and 4 calculated from $H_1(K_y)$ and $H_2(K_y)$, respectively. Neither of the candidate buckets 6 and 4 has spare capacity; thus, cuckoo hashing is performed, in which a series of displacements is made to accommodate the new fingerprint. The new fingerprint y displaces an existing fingerprint '1011' in bucket 6, which is moved to its alternate bucket 4, displacing another fingerprint '0101' in bucket 4. Each of the displaced fingerprints (i.e., '1011' in bucket 6, '0101' in bucket 4 and '1101' in bucket 2) is moved in turn to its alternate bucket until a displaced fingerprint can be moved to an empty slot. In this case, '1101' is moved from bucket 2 to an empty slot in its alternate bucket 1.

FIG. 1B illustrates the cuckoo filter table 100 after the keys $K_x$ and $K_y$ have been added. To subsequently determine whether $K_x$ is in the set, the candidate buckets for $K_x$ (i.e., buckets 4 and 0) are calculated from $H_1(K_x)$ and $H_2(K_x)$, respectively. Accordingly, the fingerprints in buckets 4 and 0 are compared with the fingerprint x for key $K_x$, which is again calculated using the fingerprint hash function $H_F(K_x)$. If x is found in either of the candidate buckets 0 or 4, then $K_x$ is determined to be likely in the set. However, if x is not found in either of the candidate buckets, then $K_x$ is determined not to be in the set. Similarly, the presence of $K_y$ in the set is likely if the fingerprint y calculated from $H_F(K_y)$ is found in either of the candidate buckets 6 and 4, calculated from $H_2(K_y)$ and $H_F(K_y)$.

In one embodiment, a bucketized approximate set membership data structure (ASMDS) such as a cuckoo filter is stored in a compressed format to consume less storage space and also achieve faster speeds for operations such as lookups, insertions, and deletions. In the compressed representation, empty entries are not stored; instead, the number of occupied slots is stored for each bucket in the data structure in a fullness counter array. In one embodiment, in-situ reads and updates are performed directly on the compressed representation. In contrast with other types of ASMDS, such embodiments of a compressed cuckoo filter support deletions and counting of added keys without a drastic increase in memory usage.

Figure 2:
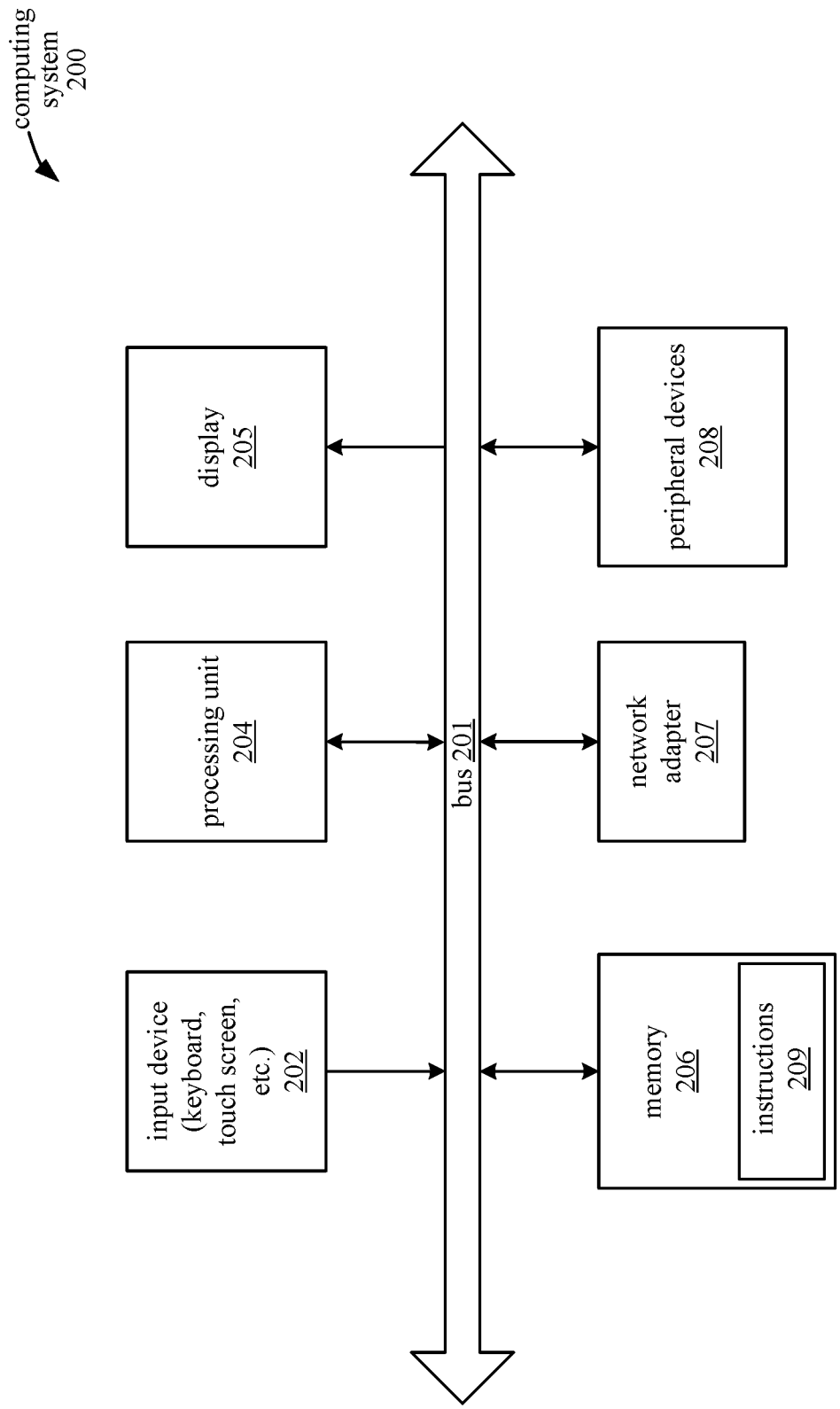
FIG. 2 illustrates a computing system, according to an embodiment.

FIG. 2 illustrates an embodiment of a computing system 200 in which a compressed cuckoo filter is implemented. In general, the computing system 200 is embodied as any of a number of different types of devices, including but not limited to a laptop or desktop computer, mobile device, server, network switch or router, etc. The computing system 200 includes a number of components 202-208 that communicate with each other through a bus 201. In computing system 200, each of the components 202-208 is capable of communicating with any of the other components 202-208 either directly through the bus 201, or via one or more of the other components 202-208. The components 201-208 in computing system 200 are contained within a single physical enclosure, such as a laptop or desktop chassis, or a mobile phone casing. In alternative embodiments, some of the components of computing system 200 are embodied as peripheral devices such that the entire computing system 200 does not reside within a single physical enclosure.

The computing system 200 also includes user interface devices for receiving information from or providing information to a user. Specifically, the computing system 200 includes an input device 202, such as a keyboard, mouse, touch-screen, or other device for receiving information from the user. The computing system 200 displays information to the user via a display 205, such as a monitor, light-emitting diode (LED) display, liquid crystal display, or other output device.

Computing system 200 additionally includes a network adapter 207 for transmitting and receiving data over a wired or wireless network. Computing system 200 also includes one or more peripheral devices 208. The peripheral devices 208 may include mass storage devices, location detection devices, sensors, input devices, or other types of devices used by the computing system 200.

Computing system 200 includes a processing unit 204. The processing unit 204 receives and executes instructions 209 that are stored in a memory system 206. In one embodiment, the processing unit 204 includes multiple processing cores that reside on a common integrated circuit substrate. Memory system 206 includes memory devices used by the computing system 200, such as random-access memory (RAM) modules, read-only memory (ROM) modules, hard disks, and other non-transitory computer-readable media.

Some embodiments of computing system 200 may include fewer or more components than the embodiment as illustrated in FIG. 2. For example, certain embodiments are implemented without any display 205 or input devices 202. Other embodiments have more than one of a particular component; for example, an embodiment of computing system 200 could have multiple processing units 204, buses 201, network adapters 207, memory systems 206, etc.

Figure 3:
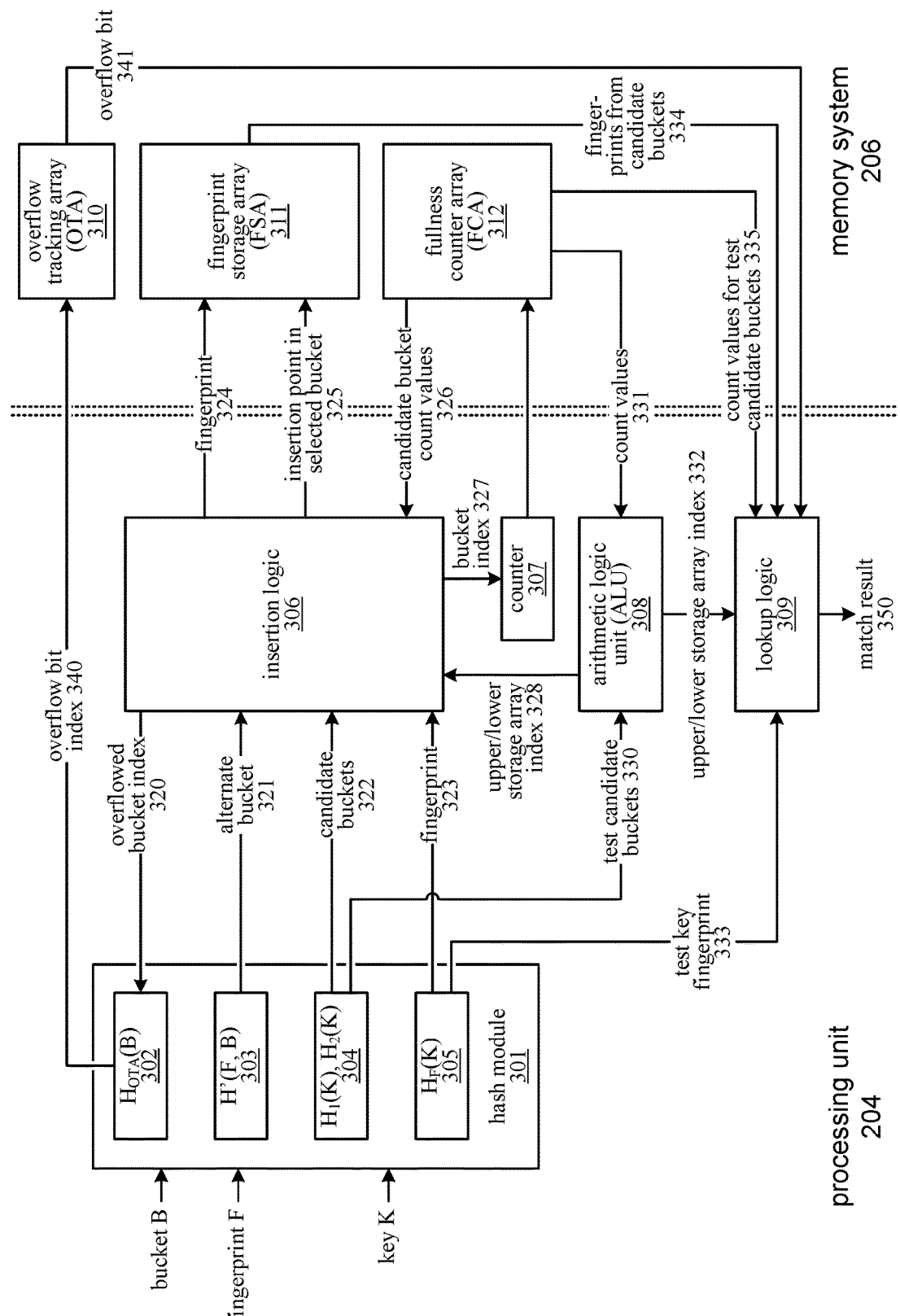
FIG. 3 illustrates components in a processing unit and a memory system in a computing device, according to an embodiment.

FIG. 3 is a block diagram illustrating devices in the computing system 200, including the processing unit 204 and the memory system 206, according to an embodiment. The components illustrated in FIG. 3 include various modules that are implemented as circuitry (e.g., circuit modules), programmable logic, software, or a combination of hardware and software components.

Memory system 206 includes multiple arrays that make up the compressed cuckoo filter; these include a fingerprint storage array (FSA) 311, a fullness counter array (FCA) 312, and an overflow tracking array (OTA) 310. The FSA 311 stores a sequence of entries, where each entry includes a fingerprint for a key. In alternative embodiments, each entry in the storage array 311 stores a different type of data value instead of or in addition to a fingerprint, such as key-value pairs, single data items (i.e., keys without values), data structures, pointers to data structures, metadata, etc. In the FSA 311, the order of the sequence of the entries corresponds to the order of a set of buckets (each bucket is associated with an index value indicating its ordinal position in the set of buckets). Accordingly, the position of each entry in the sequence can be used to determine the bucket in which the entry is located using count values that indicate the number of entries in each bucket. For each bucket in the data structure, a count value indicating the number of entries in the bucket is stored in the fullness counter array (FCA) 312. The FCA 312 stores the count values in an order corresponding to the sequential order of their respective buckets. The overflow tracking array (OTA) 310 stores overflow bits indicating whether each bucket has overflowed (i.e., a maximum number of entries that can be stored in the bucket has been exceeded).

In one embodiment, the FSA 311, FCA 312, and OTA 310 in the memory 206 are all stored on a single physical memory device or subsystem in the computing system 200. In alternative embodiments, these arrays are distributed across multiple memory devices in the same computing system 200 or in multiple systems.

The processing unit 204 includes a hash module 301, insertion logic 306, counter 307, arithmetic logic unit (ALU) 308, and lookup logic 309. Each of these components is implemented using logic circuits and memory circuits in the processing unit 204. In alternative embodiments, the modules are implemented in software or a combination of hardware and software elements.

The hash module 301 includes logic for performing a number of different types of hash operations, including bucket hashes $H_1(K)$ and $H_2(K)$ 304, a fingerprint hash $H_F(K)$ 305, an alternate bucket hash H'(F, B) 303, and an overflow tracking hash $H_{OTA}(B)$ 302. In this section, K, F, and B are used to generically refer to any key, fingerprint, and bucket, respectively, on which the hash functions 302-305 operate. The bucket hashes 304 include a first hash function $H_1(K)$ that computes for a key K a first candidate bucket from the set of buckets. The hash module 301 receives each key K to be added to the set (or tested for membership in the set), and executes the first bucket hash $H_1(K)$ on the key K to identify a first candidate bucket in which the key K could possibly be stored (or found, when testing membership of the key K). The second bucket hash function $H_2(K)$ operates in a similar manner as $H_1(K)$ to calculate a second candidate bucket in which the key K could be stored or found.

The hash module 301 also includes logic for calculating a fingerprint for each key K using a fingerprint hash $H_F(K)$ 305. The fingerprint hash 305 is used to compute a fingerprint for each key K to be added to the set or checked for membership in the set. The key K is added to the set by inserting the fingerprint for the key K as an entry in the sequence of entries in the FSA 311, in a position corresponding to one of the candidate buckets calculated from the bucket hashes 304.

The insertion logic 306 performs operations for adding each key K to the filter. For each key K, the insertion logic 306 receives the candidate buckets 322 calculated from the bucket hashes 304 and the fingerprint 323 calculated from the fingerprint hash 305. The insertion logic 306 selects one of the candidate buckets 322 and inserts the fingerprint 323 as an entry in the sequence of entries in the FSA 311, in a position that corresponds to the selected candidate bucket. The insertion logic 306 thus stores each of the entries in the FSA 311. This sequence of entries is stored in a compressed form at contiguous memory locations in the same region of the memory system 206. In alternative embodiments, the entries are stored in deterministic locations in the memory region that are noncontiguous. For example, in such embodiments, the storage locations are permuted, or spacer bits or fields are placed between the entries.

When performing an insertion, the insertion logic 306 selects one of the candidate buckets 322 that has an empty slot available for storing the new fingerprint. Whether or not a candidate bucket has empty slots is determined based on the count values 326 for the candidate buckets from the FCA 312. For example, in response to determining that the first candidate bucket is full, the insertion logic 306 selects the second candidate bucket as the selected bucket if the second candidate bucket has an empty slot.

However, if both of the candidate buckets 322 are full (i.e., do not have any empty slots), the insertion logic 306 relocates an entry from one of the candidate buckets 322 to that entry's alternate bucket to vacate a slot for the new fingerprint entry. For example, in response to determining that both of the first bucket and the second bucket are full, the insertion logic 306 relocates another entry from the first bucket to its alternate bucket, then selects the first bucket for storing the new fingerprint entry. The alternate bucket hash H'(F, B) 303 is executed on the fingerprint F being relocated and its bucket B to compute the alternate bucket 321 for the fingerprint F. The insertion logic 306 receives the alternate bucket 321 index and relocates the fingerprint to the alternate bucket 321. This process repeats for each fingerprint that is relocated, until a fingerprint is stored in an already empty slot.

The insertion logic 306 also outputs an overflowed bucket index 320 for each bucket from which an entry is relocated. For each of these overflowed buckets, the insertion logic 306 has attempted to insert a fingerprint when the bucket was already full. Accordingly, the insertion logic 306 transmits the bucket index 320 for each overflowed bucket to the hash module 301, which uses the overflowed bucket index 320 as a bucket B for calculating an overflow bit index 340 using the overflow tracking hash $H_{OTA}(B)$ 302. In various embodiments, the overflow tracking hash $H_{OTA}(B)$ 302 is a function of the bucket B, fingerprint F, or both. The overflowed bucket index 320 identifies a bit to assert in the overflow tracking array 310, which can be subsequently referenced to determine whether the bucket had previously overflowed.

For each fingerprint that is added to a bucket in the FSA 311, the insertion logic 306 transmits an index 327 of the bucket to a counter 307, which increments a count value corresponding to the bucket and writes the count value in the FCA 312. The counter 307 thus maintains a running count of the number of entries in each bucket; each bucket is associated with its own count value in the FCA 312 that indicates the number of entries in the bucket. The set of count values is stored in the FCA 312 in an order corresponding to the sequential order of the buckets.

When performing an insertion of a new entry in the sequence of entries, the insertion logic 306 determines where in the sequence to insert the new entry based on an upper and/or lower storage array index 328 that is calculated by the arithmetic logic unit (ALU) 308 based on one or more consecutive count values 331 from the FCA 312. In particular, the ALU 308 sums the consecutive count values 331, which correspond to the consecutive buckets preceding the selected candidate bucket in the sequence of buckets. In one embodiment, the bucket index is used to reference the corresponding count value for the bucket in the FCA 312, such that each of the count values that are summed has a lower index in the FCA 312 than the count value for the selected candidate bucket. The ALU 308 similarly calculates an upper storage array index for the selected candidate bucket by adding one less than the count value of the selected bucket to the previously calculated lower storage array index. The upper and/or lower storage array indexes 328 indicate the range of positions in the sequence of entries that corresponds to the selected candidate bucket. Accordingly, the insertion logic 306 inserts the new entry adjacent to one of these entries in the FSA 311 in order to write the entry in the selected candidate bucket. The insertion logic 306 provides the new fingerprint entry 324 and indicates the insertion point 325 (i.e., address) in the selected candidate bucket to the memory 206, and the fingerprint 324 is stored at the indicated insertion point 325 in the FSA 311.

The lookup logic 309 performs operations for testing whether a particular test key K has been previously added to the compressed cuckoo filter by checking for the key's fingerprint in the key's candidate buckets (excluding bucket accesses that are filtered out by the OTA 310). The lookup logic 309 also locates the fingerprint for the key K when a deletion is performed. The hash module 301 computes candidate buckets 330 and a fingerprint 333 for the test key K by executing the bucket hashes $H_1(K)$ and $H_2(K)$ 304, and the fingerprint $H_F(K)$ 305 on the test key K. The lookup logic 309 receives the upper and lower storage array indexes 332 from the ALU 308, which are calculated by the ALU 308 for each of the candidate buckets 330. For each of the candidate buckets 330, the fingerprints existing in the bucket are identified by the upper and lower storage array indexes 332; each of these fingerprints has an index in the FSA 312 equal to or between the lower storage array index and the upper storage array index for the bucket. The lookup logic 309 compares the fingerprint 333 of the test key with the fingerprints 334 in the candidate buckets 330, which are read from the FSA 311.

In one embodiment, the lookup logic 309 performs a prefiltering function for lookups by checking the FCA 312 for the count values 335 for the candidate buckets prior to retrieving the fingerprints 334 from the FSA 311. If the count value for one of the candidate buckets for the test key is zero (i.e., indicates that no entries are present in the candidate bucket), then the fingerprint is determined not to be in the bucket without performing any further memory accesses or computations.

Figure 4:
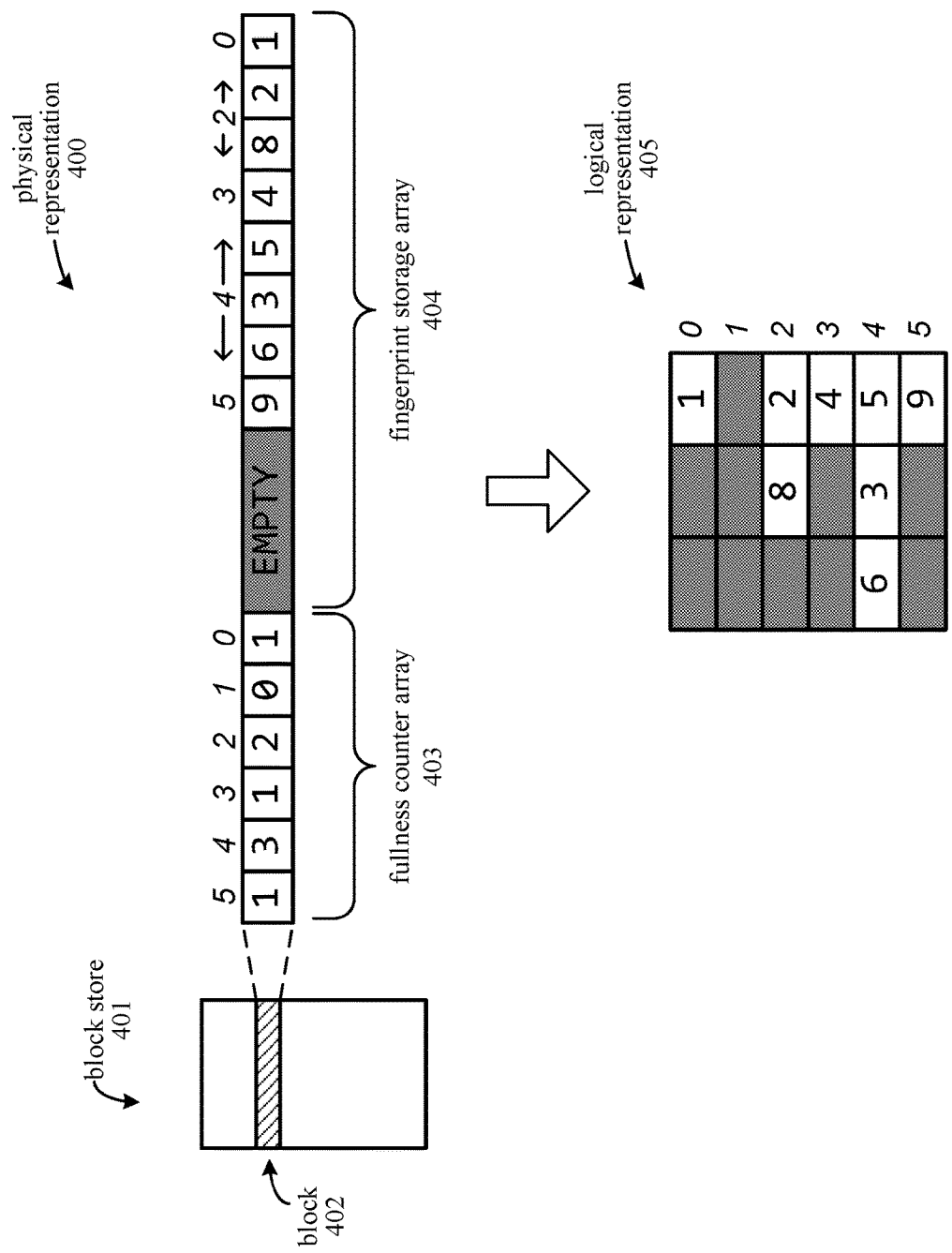
FIG. 4 illustrates representations of a compressed cuckoo filter, according to an embodiment.

FIG. 4 illustrates an approach for storing a compressed cuckoo filter in the memory system 206, according to an embodiment. In the physical representation 400 of the compressed cuckoo filter, the compression is achieved by storing the contents of occupied slots, without storing the empty slots. Instead of being explicitly stored, empty slots are instead encoded by a smaller count value that is equal to the number of occupied slots in its corresponding bucket. This compression format allows for a logically underloaded table to make efficient use of memory and to reduce both the number of slots per bucket and the number of buckets that are checked for each lookup. Larger buckets having a greater number of slots per bucket are also accommodated without greatly increasing the number of bits per item in the table. By contrast, in a baseline cuckoo filter, each power of 2 of additional slots per bucket causes the fingerprint length to increase by 1 to maintain a fixed error rate. While the approach for compressing the information in the filter is described in this section with reference to a cuckoo filter, alternative embodiments employ the same approach with other types of bucketized filters in which entries are stored in different buckets, but which utilize a hashing mechanism other than cuckoo hashing.

In alternative embodiments, the number of entries in the bucket can be encoded in or indirectly indicated by values other than a count value that directly represents the number of entries in the bucket. For example, the number of empty slots in the bucket, the locations in the block at which values are stored, and/or other indications can be used as a basis for calculating the number of occupied slots in the bucket or for determining which entries in the FSA 404 correspond to slots in the bucket.

As illustrated in FIG. 4, the physical representation of the compressed cuckoo filter is stored in a block store 401, which is a memory region in the memory system 206. The blocks (e.g., block 402) in the block store 401 are sized subject to a low-level hardware parameter, even divisions of a hardware cache line, a physical page, or a solid-state drive (SSD) block.

Each block in the block store 401 stores a fixed number of compressed buckets along with their portion of the FCA 312. In particular, block 402 contains a portion of the cuckoo filter, including a portion of the fullness counter array 403 and a portion of the fingerprint storage array 404. In one embodiment, the fullness counter array 403 and the fingerprint storage array 404 portions are stored in adjacent regions of the block 402. In this example, each block stores 6 count values in the FCA 403 and thus encodes 6 logical buckets, having indexes from 0-5. The FSA 404 stores the entries for the set of six buckets. Each of the count values and entries in the physical representation 400 is labeled above with its associated bucket. In both of the arrays 403 and 404, the count values or entries associated with lower-indexed buckets are located nearer to the least significant bit of the block than any count values or entries associated with higher-indexed buckets.

The logical representation 405 shows the contents of the block 402 in a logical table form. Each of the buckets 0-5 is illustrated as a row in the table, with the cells in each row representing slots. To the right of each row is a bucket index identifying the bucket represented by the row. The entries in the FSA 404 are shown as being located in the rows representing their respective buckets in the representation 405.

Within the FCA portion 403, each count value has the same index as its associated bucket, and stores a count value indicating how many slots in the associated bucket are occupied. The number of slots in each bucket is tunable by adjusting the width w of each count value in the FCA 403. In general, a w-bit count value can track the number of entries in a bucket that has at most $2^{w-1}$ slots because one of the $2^w$ counter states is used to indicate that the bucket is empty. This leads to bucket sizes that, aside from 1-slot buckets, are not powers of 2 (e.g., 3, 7, 15, 31).

In one embodiment, bucket sizes that are powers of 2 or other arbitrary sizes are achieved by storing multiple count values in a code word to reduce space usage. For example, two-slot buckets can exist in three different states: empty, 1-full, and 2-full. Thus, five count values having $3^5=243$ possible states are represented as an 8-bit code word having $2^8=256$ possible states. The two-slot buckets are tracked using 8/5 bits (1.6 bits) per counter rather than 2. Similarly, a four-slot bucket has five states, so three count values (representing $5^3$, or 125, possible states) are packed into a 7-bit code word with 128 possible states. For the 4-slot buckets the per-counter storage cost is reduced from 3 bits per counter to 7/3 bits per counter. Encoding and decoding of code words can be done efficiently using either a lookup table or via computation.

Figure 5A:
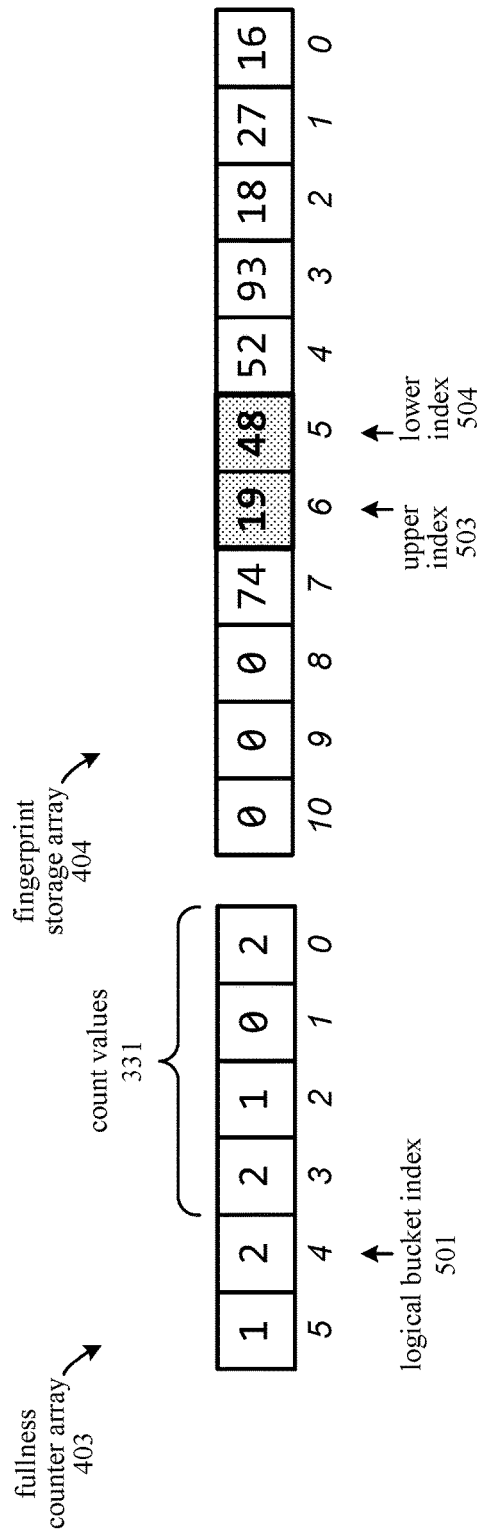
FIG. 5A illustrates a fullness counter array and a fingerprint storage array of a compressed cuckoo filter, according to an embodiment.

FIG. 5A illustrates a FCA 403 and a FSA 404 in which count values in the FCA 403 are used to determine the extent of a logical bucket, according to an embodiment. The logical extent of the bucket is computed directly on the compressed block in which it resides without materializing a complete logical view of the bucket or block. Thus, operations such as lookups and updates operate in-situ on the compressed representation, with the FCA 403 providing the locations in the FSA 404 at which to apply these operations.

A lookup operation determines whether a test key has previously been added to the filter by checking for the presence of a fingerprint 333 of the test key in the FSA 404. The fingerprint for a test key K is determined by executing the hash $H_F(K)$, and two candidate buckets 330 for the key K are computed by executing the bucket hashes $H_1(K)$ and $H_2(K)$ 304 on the key K. Each candidate bucket 330 is identified by its logical bucket index. In the example illustrated in FIG. 5A, the logical bucket index 501 for a first one of the candidate buckets is '4'; accordingly, the count value for the candidate bucket is at index '4' in the FCA 403. The set of consecutive count values 331 corresponding to the buckets 0, 1, 2, and 3, having a lower index than the candidate bucket 4 are summed to determine the lower index 504 of the candidate bucket. In this case, the lower index 504 is '5'.

The count value corresponding to the candidate bucket 4 (at index '4' in the FCA) indicates that there are two entries in bucket 4. Thus, the fingerprint 333 for the test key K is compared with the two fingerprints beginning at the lower index 504 in the FSA 404. In one embodiment, the upper index 503 of the candidate bucket is calculated by adding one less than the count value of the candidate bucket to the lower index 504. Continuing the example, 1 is subtracted from the candidate bucket's count value of '2'. The resulting '1' is added to the lower index 504 value of '5', yielding the upper index 503 value of '6'. In one embodiment, the fingerprint 333 is compared with each of the fingerprints including and between the lower index 504 and the upper index 503 of the FSA 404. These fingerprint values are '48' and '19'.

In one embodiment, the lower index of the next sequential bucket after the candidate bucket is calculated by adding the candidate bucket's count value '2' to the lower index 504. The test key fingerprint 333 is compared with each fingerprint in the FSA 404 starting from the lower index 504 and proceeding up to but not including the lower index of the next sequential bucket (i.e., index '7').

The fingerprint values in the candidate bucket are '48' and '19'; thus, if the fingerprint 333 matches either of these values, the match result 350 is asserted, indicating that the test key was likely previously added to the filter. In one embodiment, the fingerprint comparisons and the calculations for determining the upper index 503 and lower index 504 are performed in the ALU 308.

In one embodiment, the FCA 403 can be used as a preliminary filter when performing lookup operations. If a candidate bucket does not contain any fingerprints, then no match for the test key fingerprint 333 will be found in the bucket. Thus, some computations associated with the normal comparison process can be avoided by first checking whether the candidate bucket has a zero count value in the FCA 403.

Figure 5B:
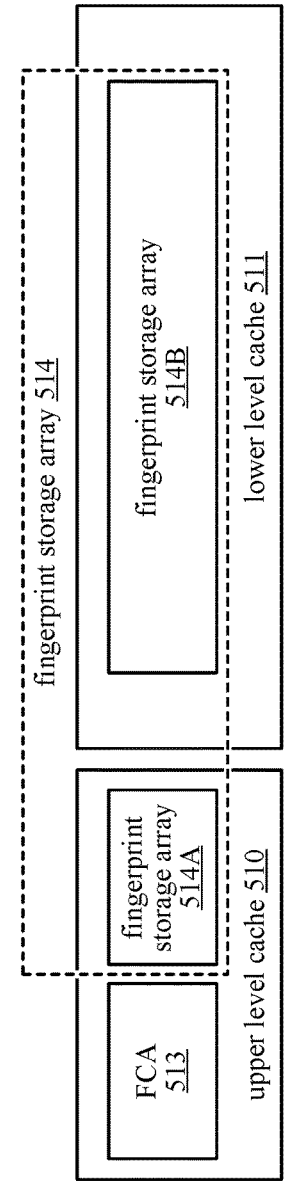
FIG. 5B illustrates cache levels for the fullness counter array and fingerprint storage array, according to an embodiment.

FIG. 5B illustrates an embodiment in which the fullness counter array (FCA) 513 is stored separately from some or all of the fingerprint storage array (FSA) 514. As illustrated in FIG. 5B, the FSA 514 is divided into two portions 514A and 514B. Each of the portions 514A and 514B stores a portion of each fingerprint; that is, for each fingerprint, a first part of the fingerprint is stored in portion 514A and the remainder of the fingerprint is stored in portion 514B. When performing a lookup to find a fingerprint in a candidate bucket, the FCA 513 is checked to determine whether the candidate bucket has a zero count value. If not, the first part of the test fingerprint is compared with the fingerprint portions for the candidate bucket in the FSA 514A. If a partial match is found in FSA 514A, the test fingerprint is compared with the remaining portion of the matching fingerprint in FSA 514B.

The FCA 513 and FSA 514A are cached in a faster and smaller upper level cache 510, while the FSA 514B is cached in a slower and larger lower level cache 511. Accordingly, if the count value of the candidate bucket is zero or if the test fingerprint does not match any first portion of a fingerprint in the FSA 514A, the match result is determined to be false (i.e., no match) without accessing the FSA 514B in the slower lower level cache 511. In other words, a large proportion of non-matching lookups are potentially disposed without accessing the lower level cache 511. For filters that cannot be completely stored in the upper level cache 510, this mechanism avoids a high miss ratio in the upper level cache 510. In alternative embodiments, the FCA 513 and the FSA 514 are divided across more than two levels of cache. In one embodiment, the FCA 513 is cached by itself in a fastest cache level that does not store any portion of the FSA 514.

FIGS. 6A and 6B illustrate an approach for quickly adding a sequence of count values (e.g., count values 331) using bit masks and a hardware population count (popcount) instruction, according to an embodiment. The addition process is performed using the logical bucket index (lbi) 601 for the candidate bucket, the FCA 603 of the block, and the count value width w in bits. The addition process sums the count values 602; similar to count values 331, the count values 602 correspond to the buckets that precede the candidate bucket in the bucket order. These count values 602 are represented by the first w×lbi bits of the FCA 603; thus, in FIG. 6A the count values having indexes higher than the lbi 601 are masked out by performing a bitwise AND operation 605 between the FCA 603 and a bit mask 604.

The AND operation 605 using bit mask 604 also selects the 0th place bit in each of the count values 602. The popcount operation 606 is applied to count the number of asserted bits in the mask result. The popcount result is then bit shifted 607 by the iteration number, which in this case is '0' because the asserted 0th place bits were counted. The bit shifting 607 of the popcount result by 0 bits results in an intermediate value 608 of '0b01'. The intermediate value 608 is added 609 to a 'sum' value.

In FIG. 6B, the bit mask 610 is similar to bit mask 604, but selects the 1st bit of the count values 602 (instead of the 0th bit) via the AND operation 611. The popcount operation 612 is applied to the masked result and the popcount result of '01' is bit shifted 613 by the iteration number of '1'. The bit shifting 613 of the popcount result by 1 bit results in an intermediate value 614 of '0b10'. The intermediate value 614 is added 615 to the sum. After an iteration has been performed for each of the w bit places, the resulting sum represents the sum of the count values 602. In this example, the final sum is '0b11', or '3', which is equal to the sum 2+0+1 of the count values 602.

Figure 7A:
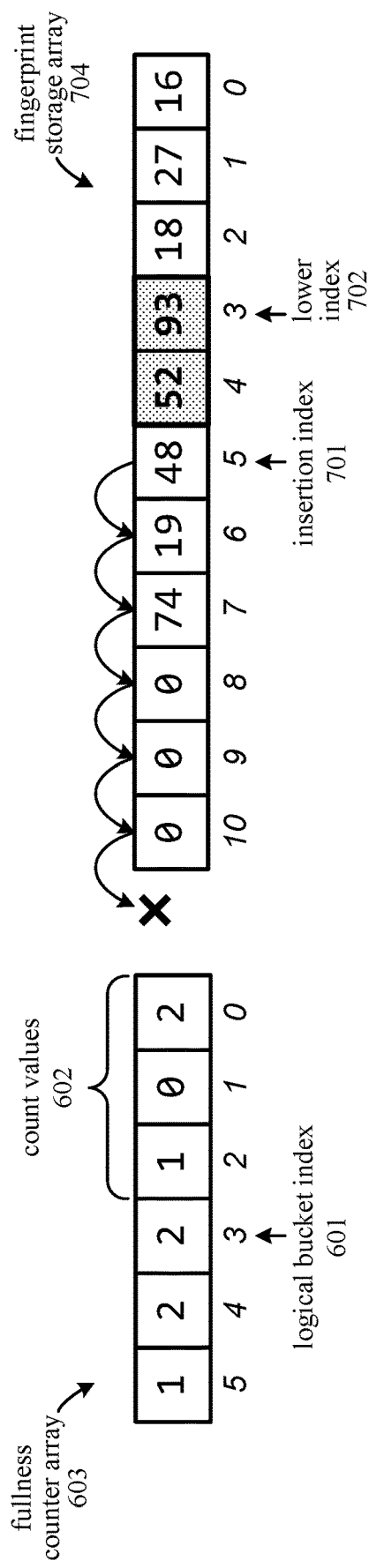
FIGS. 7A and 7B illustrate the insertion of a fingerprint entry in a compressed cuckoo filter, according to an embodiment.
Figure 7B:
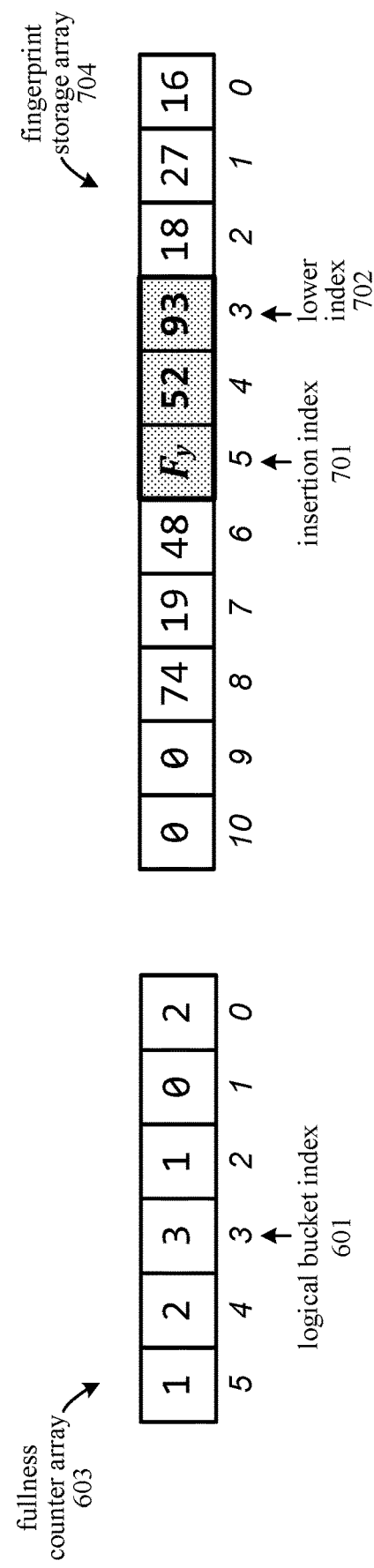

FIGS. 7A and 7B illustrate the insertion of a fingerprint entry into a candidate bucket in the FSA 704, according to an embodiment. FIG. 7A shows the block, including FCA 603 and FSA 704, while the insertion is being performed. FIG. 7B illustrates the block after the insertion has been completed. With reference to FIG. 7A, the insertion is performed by summing the count values 602 for all of the buckets having a lower logical bucket index (i.e., buckets 0, 1, and 2) than the bucket index 601 of the candidate bucket, which in this case is bucket 3. The sum of the count values 602 is the lower index 702 of the candidate bucket 3. The count value for the candidate bucket is added to the lower index 702 to calculate the insertion index 701. Here, the count value of '2' is added to the lower index 702 value of '3', so the insertion index 701 is 5. In the FSA 704, fingerprints at indexes equal to and higher than the insertion index 701 (i.e., indexes 5-10) are shifted one space to the left, as indicated by the arrows, to make room for the new fingerprint $F_y$. The value at index 10 is shifted out of the FSA 704 and is lost. With reference to FIG. 7B, the new fingerprint $F_y$ is written to the newly vacated slot at the insertion index 701 and the count value for the candidate bucket at index 601 in the FCA 603 is incremented by one to reflect the inserted fingerprint entry.

FIGS. 8A and 8B illustrate the deletion of a fingerprint $F_y$ from a selected bucket in the FSA 704, according to an embodiment. FIG. 8A illustrates the block as the deletion is being performed, while FIG. 8B illustrates the block after the deletion has been completed. To perform the deletion, the count values 602 are summed to determine the lower index 702 of the block. The count value at the logical bucket index 601 is '3', so three consecutive fingerprints, starting from the lower index 702, are compared with the fingerprint $F_y$ to be deleted. If the fingerprint $F_y$ is not found from among the three fingerprints (at indexes 3, 4, and 5), the deletion fails.

However, if the fingerprint $F_y$ is found at index 5 in the FSA 704, as illustrated in FIG. 8A, the entries having a higher index than $F_y$ are shifted to the right by one slot, which deletes $F_y$. The count value at bucket index 601 is decremented to reflect the deletion of $F_y$ from the bucket.

Figure 9B:
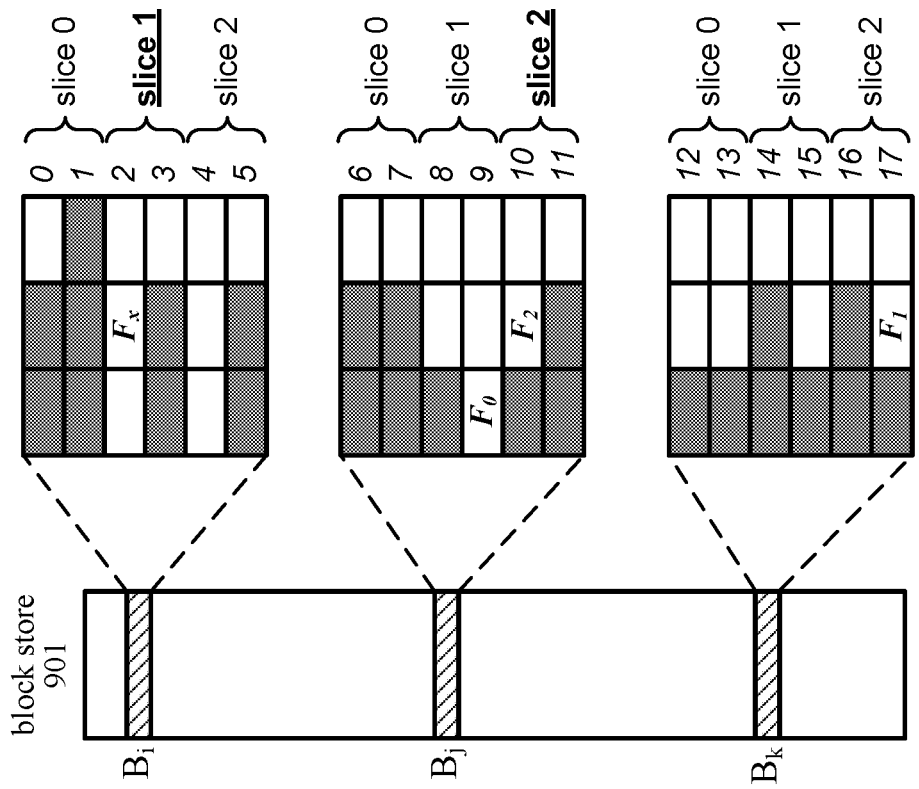
FIGS. 9A and 9B illustrate bucket and block overflows during an insertion of a fingerprint entry in a compressed cuckoo filter, according to an embodiment.
Figure 9A:
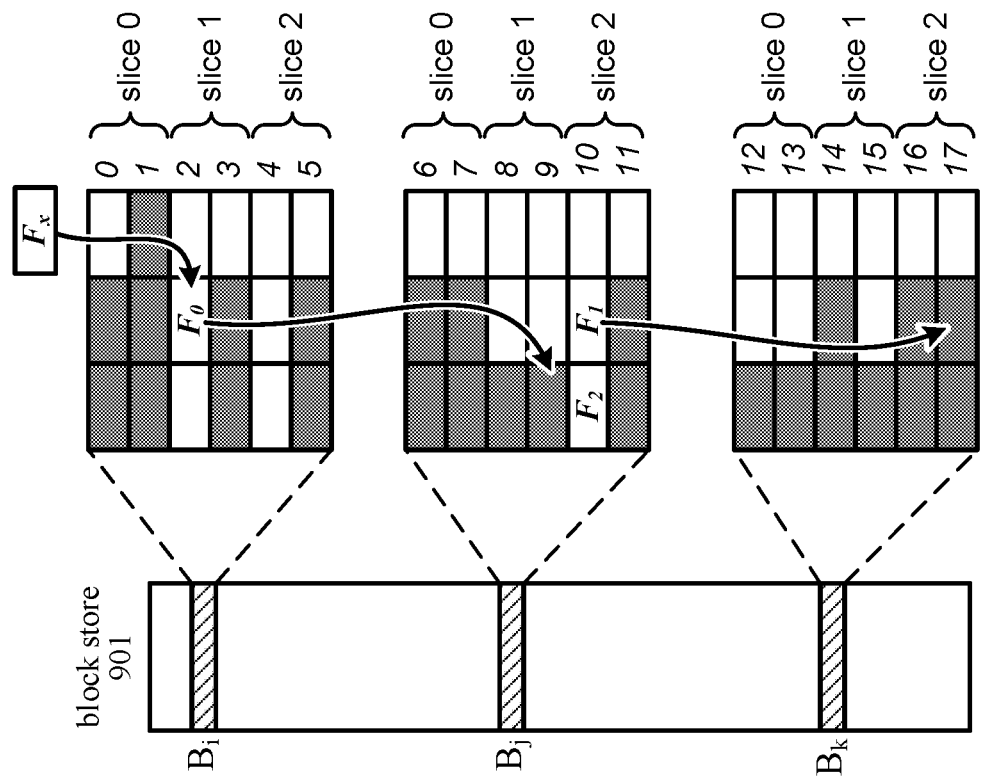

FIGS. 9A and 9B illustrate an approach for performing an insertion that reduces the overall number of buckets that are accessed per lookup in a compressed cuckoo filter, according to an embodiment. Since each fingerprint can be in either of two candidate buckets, performing a lookup of a fingerprint often includes accessing two buckets. In one embodiment of a compressed cuckoo filter, the average number of buckets accessed per lookup is reduced by, for each of multiple slices (i.e., subsets each including one or more buckets), recording whether at least one bucket in the slice has overflowed. In one embodiment, each slice includes only a single bucket, so that an overflow bit is recorded for each bucket; alternatively, each slice includes two or more buckets to reduce the storage cost for storing the overflow bits.

An overflow condition can occur for a slice when any one of the buckets in the slice has had an entry displaced. Entries are displaced due to bucket overflows, which occur when the count value for the bucket reaches its maximum value, or due to block overflows, which occur when the block is full (i.e., when the FSA 514 has no free slots to store new fingerprints). Under either of these conditions, attempting to add an entry to the bucket or block results in an overflow condition that causes an overflow bit to be asserted for the slice in which the overflow occurs.

For lookups that are performed in slices in which no overflow has occurred, the test fingerprint is compared with fingerprints in only one of the candidate buckets before the test fingerprint is either matched or determined not to be present in the filter. For lookups that are performed in slices in which an overflow has occurred, the second candidate bucket is accessed if the fingerprint is not matched with any fingerprint in the first candidate bucket. The test fingerprint fails to match in both buckets before it is determined not to be present in the filter.

By recording overflow events for the buckets, the compressed cuckoo filter reduces the overall number of bucket accesses for performing lookups. In one embodiment, the filter accesses closer to one bucket per lookup on average instead of two. Accordingly, fewer cache lines are accessed for each lookup, conserving memory and cache bandwidth. In addition, accessing fewer buckets allows for a reduction in the fingerprint length. For instance, reducing the average number of buckets checked per lookup from 2 to approximately 1 reduces the length of each fingerprint by about 1 bit, for a comparable filter with the same false positive rate. A higher load factor is also achievable on the compressed block.

In the insertion operation illustrated in FIGS. 9A and 9B, multiple blocks experience fingerprint displacements due to both bucket and block overflows, and the overflow events are tracked, according to an embodiment. FIG. 9A illustrates the application of the insertion updates, while FIG. 9B illustrates the updated compressed cuckoo filter after the insertion has been completed. Block store 901 includes multiple blocks $B_i$, $B_j$, and $B_k$; the logical representation for each of these blocks is illustrated to the right of the block. In the illustrated embodiment, each of the blocks $B_i$, $B_j$, and $B_k$ stores a maximum of 10 fingerprint entries in compressed format. With reference to FIG. 9A, each of the three blocks $B_i$, $B_j$, and $B_k$ has its buckets grouped into three slices 0, 1, and 2, with two buckets per slice. Thus, overflow events are tracked for 9 different slices independently. Initially, none of the slices have previously overflowed. In FIGS. 9A and 9B, the unshaded slots are occupied and the shaded slots are empty.

The insertion operation begins by attempting to insert a fingerprint $F_x$ in its first candidate bucket 2 in block $B_i$. However, bucket 2 is full, so fingerprint $F_0$ is evicted from bucket 2. This eviction is a bucket overflow since bucket 2, rather than block $B_i$, lacks sufficient storage capacity. Fingerprint $F_0$ is evicted to its alternate bucket, which is bucket 9 in block $B_j$.

However, block B already has the maximum number of 10 fingerprint entries, and therefore has no free slots available to accommodate $F_0$ (it does not matter that the logical representation has spare slots). Thus, a block overflow occurs, and a fingerprint entry in block $B_j$ is selected for eviction. In one embodiment, the entry is selected for eviction that results in the smallest number of subsequent displacements, or the selection is biased to evict fingerprint entries from higher-numbered slices. Continuing the example, fingerprint $F_1$ is selected for eviction from block $B_j$. Fingerprint $F_1$ is successfully relocated to its alternate bucket 17 in block $B_k$. Bucket 17 has two empty slots; therefore, no bucket overflow occurs. Block $B_k$ only has 9 entries; therefore, a block overflow does not occur.

The insertion process caused a bucket overflow at bucket 2, in slice 1 of block $B_i$. Therefore, slice 1 of block $B_i$ is marked as having overflowed. The insertion process also caused a block overflow at block $B_j$, resulting in the eviction of an entry from bucket 10. Bucket 10 is in slice 2; therefore, slice 2 of block $B_j$ is marked as having overflowed. FIG. 9B illustrates the locations of fingerprints $F_x$, $F_0$, $F_2$, and $F_1$ after the insertion is completed. Slice 1 in block $B_i$ and slice 2 in block $B_j$ are underlined to show that an overflow event has occurred in these slices. A lookup operation for a fingerprint in one of these slices checks both candidate buckets instead of only one.

Even for a very full table, most block overflows are resolved by evicting and relocating a single fingerprint. As such, the example in FIGS. 9A and 9B represents a relatively complicated insertion. In practice, most insertions succeed in placing the fingerprint in the first candidate bucket, without displacing any other fingerprints.

In one embodiment, overflow events for the slices are tracked in the overflow tracking array (OTA) 310, as previously illustrated in FIG. 3. When a bucket overflow or a block overflow occurs, the insertion logic 306 calls an overflow hash function $H_{OTA}(B)$ 302 with the bucket index 320 of the overflowed bucket as bucket B. The overflow hash function 302 deterministically generates an index 340 of the overflow bit, which indicates a location of the overflow bit for the bucket in the OTA 310. The appropriate overflow bit is then asserted in the OTA 310.

In one embodiment, the overflow hash function 302 operates on the fingerprint being evicted instead of the bucket index. In other words, for a fingerprint F that is being evicted, the overflow bit index 340 is calculated from $H_{OTA}(F)$. In one embodiment, the overflow hash function 302 operates on a combination of the evicted fingerprint and the bucket index from which the fingerprint is evicted. In alternative embodiments, the OTA 310 is implemented as another ASMDS, such as a Bloom filter, counting bloom filter, etc.

For an OTA 310 implemented as a bit vector, it is possible for multiple different fingerprints to be hashed (via the overflow hash 302) to the same overflow bit in the OTA 310. In one embodiment, all fingerprints that hash to the same overflow bit also map to alternate buckets in the same alternate block. Accordingly, it becomes possible to clear an overflow bit by determining whether the alternate block has any fingerprints that could have overflowed from the original block; such fingerprints are identified by determining that they would have mapped to the original block and would also have set the overflow bit. If the alternate block does not have any fingerprint that could have overflowed from the original block, then the overflow bit for the original block can be cleared. Since the alternate block does not contain any overflowed fingerprint, a subsequent lookup operation need not check the alternate block, and the overflow bit is deasserted. In one embodiment, fingerprints are additionally tagged with a single bit that indicates whether they were hashed to their present bucket and block location using the first bucket hash $H_1$ or the second bucket hash $H_2$. Fingerprints hashed with $H_1$ have not overflowed, and are therefore ignored when determining whether to clear the overflow bit.

Figure 10:
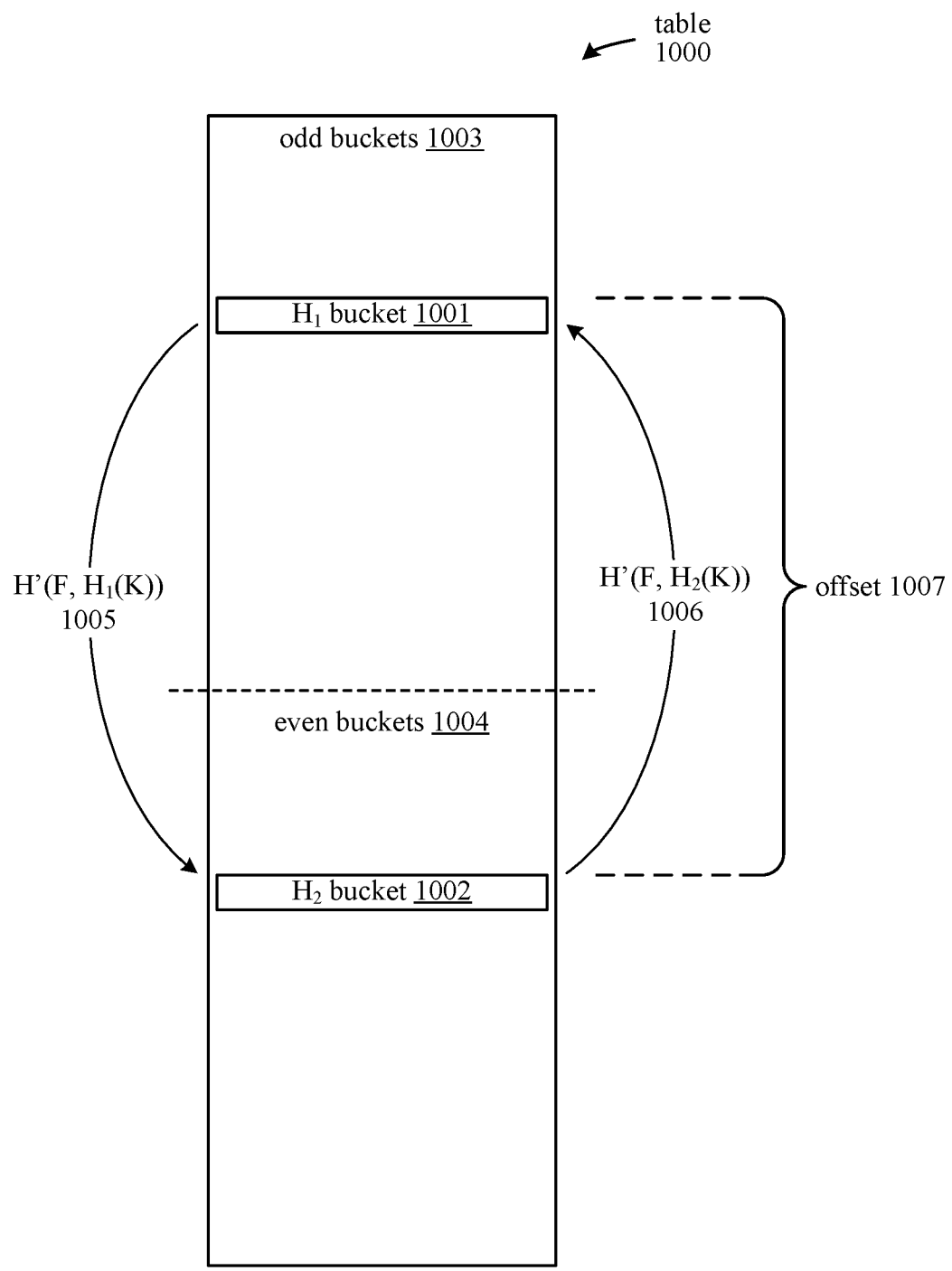
FIG. 10 illustrates hashing behavior in a compressed cuckoo filter, according to an embodiment.

FIG. 10 illustrates a hashing scheme for computing the primary and secondary candidate buckets for a key K, according to an embodiment. The hashing scheme relies on multiple hash functions, including the functions $H_1(K)$ and $H_2(K)$ for computing the primary and secondary candidate buckets based on the key K, respectively. A function H'(F, B) computes an alternate bucket for a fingerprint F based on the fingerprint F and the index B of the bucket in which the fingerprint is located. For example, when fingerprint F is in its primary bucket $H_1(K)$, then H'(F, $H_1(K)$) yields $H_2(K)$. Similarly, when F is in its secondary bucket $H_2(K)$, then H'(F, $H_2(K)$) yields $H_1(K)$. The alternate bucket calculation is used when relocating an evicted fingerprint to its alternate bucket, at which time the fingerprint value F and the bucket in which the fingerprint is located are known.

As illustrated in FIG. 10, the table 1000 is partitioned into two portions 1003 and 1004, which include the odd buckets and even buckets, respectively. When a fingerprint is relocated from an original bucket to its alternate bucket, the alternate bucket is determined by adding to or subtracting from the original bucket an odd offset 1007, with the parity of the original bucket determining the sign of the operation (i.e., whether to add or subtract). Thus, a fingerprint vacillates between its two candidate buckets with successive calls of H'. The size of the offset 1007 is tunable so that the alternate candidate bucket is usually within the same page of physical memory as the original bucket.

Equations 1-4 below describe one embodiment of such a hashing scheme:

$$H_1(K)=\text{map}(H(K),n) \quad \text{(Equation 1)}$$

$$H_2(K)=\text{map}(H_1(K)+(-1)^{H_1(K)\&1}\times\text{offset}(H_F(K)),n) \quad \text{(Equation 2)}$$

$$H'(B,H_F(K))=\text{map}(B+(-1)^{B\&1}\times\text{offset}(H_F(K)),n) \quad \text{(equation 3)}$$

$$\text{offset}(x)=(\beta+x\%\text{OFF}_{RANGE})|1 \quad \text{(Equation 4)}$$

In Equations 1-4, $\beta$ represents the number of buckets per block, n is the total number of buckets in the filter, and B is the index of the bucket in which the fingerprint F is located. Note that $H_F(K)$ is the fingerprinting function applied to key K and is equal to the fingerprint F. The function H is a hash function that takes as input a multibyte key (e.g., several bytes to hundreds of bytes) and outputs a multibyte value (e.g., four to 16 bytes). The function 'map' maps its first argument to a value between 0 and n-1 in a fashion that emulates uniform randomness. In one embodiment, the 'map' function is implemented as a simple modulo. In an alternative embodiment, it is implemented using a more sophisticated function that avoids the need for integer division when n is not a power of two. In one embodiment, the absolute bucket offset is at least $\beta$, so that block overflows map to a different block.

One embodiment of a compressed cuckoo filter is capable of counting the occurrences of items (e.g., fingerprints) within the set. For instance, if a fingerprint appears multiple times within its candidate buckets, a modified lookup is able to return the number of times the fingerprint appears. One embodiment of a compressed cuckoo filter is able to count more occurrences of a fingerprint than a bucket can store.

In one embodiment, a counter is added to every fingerprint. In this case, the filter stores a fingerprint-counter pair in each entry, rather than only a fingerprint. Counters are sized according to a maximum number of fingerprints to be counted. In an alternative embodiment, the filter begins by storing only fingerprints, and a counter is allocated as necessary for each fingerprint that appears in a bucket more than a threshold number of times. If a fingerprint appears in a bucket more than the threshold number of times, then one or more slots for storing other fingerprints are converted into space for storing the counter for the recurring fingerprint.

In one embodiment, a combination of the above schemes stores fingerprint-counter tuples but allocates less space per counter than the most frequently recurring fingerprints are likely to need. Thus, when a counter overflows, a slot or a fraction of a slot is converted into additional space for the counter. For example, in a filter starting with 4-bit counters and 8-bit fingerprints, a counter overflow causes an adjacent slot to be converted to expand the overflowed counter. In one embodiment, an additional bit is allocated per counter to indicate the overflow of the original counter while still allowing the expanded counter to be treated as a single entity.

Figure 11:
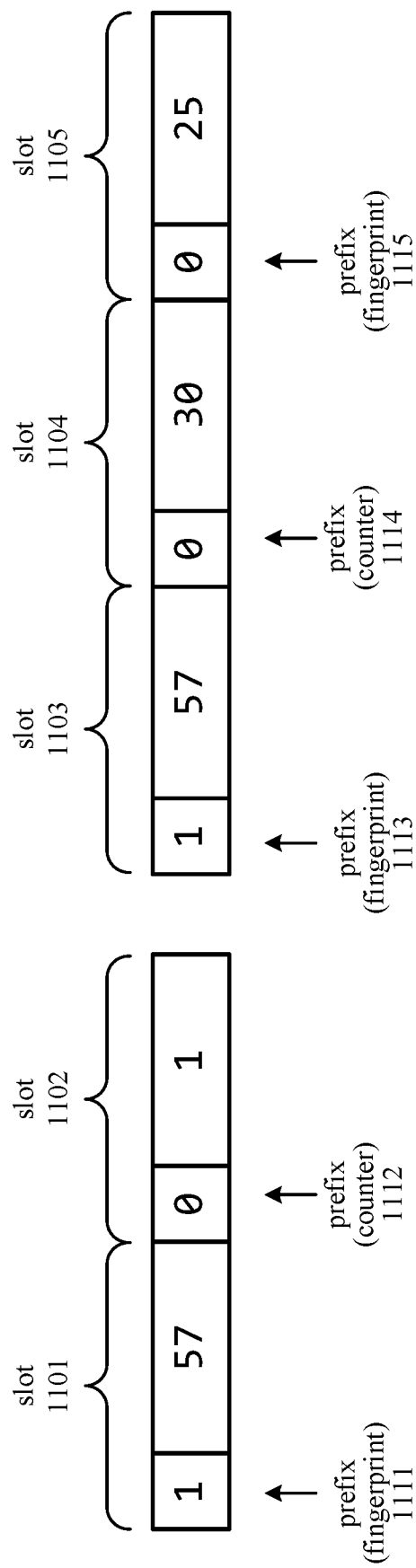
FIG. 11 illustrates counter allocation in a counting compressed cuckoo filter, according to an embodiment.

FIG. 11 illustrates slots in a counting compressed cuckoo filter in which counters are allocated as necessary, according to an embodiment. Each of the slots 1101-1105 has a prefix bit 1111-1115, respectively, that indicates whether the slot is holding a fingerprint or a counter. Slots 1101 and 1102 encode a fingerprint '57' that occurs twice. The '1' in prefix 1111 indicates that '57' is a fingerprint, and the 0 bit in prefix 1112 indicates that the slot 1102 that follows is a counter having a value of '1'. The one instance of '57' in slot 1101 is added to the one instance indicated by the counter in slot 1102, giving a total of two instances of the fingerprint '57'. In slots 1103-1105, the fingerprint '57' is encoded with a large counter that occupies two slots 1104 and 1105. The '30' in slot 1104 represents the lower order bits of the counter and the '25' in slot 1105 represents the higher order bits. The slot is f bits wide; therefore, the fingerprint '57' has a count of $1+30+25\times2^f$ for that bucket. As stated above, this scheme can be further expanded by adding an additional counter field to each entry.

In one embodiment, a compressed cuckoo hash table is similar to a compressed cuckoo filter as previously described. However, instead of storing fingerprints, the compressed cuckoo hash table stores key-value pairs as entries. Lookups proceed by examining the enabled candidate buckets. Similar to the compressed cuckoo filter, tracking overflows for slices in an overflow tracking array reduces the mean number of buckets that are accessed per lookup.

In one embodiment, a compressed cuckoo hash table is disaggregated into two separate tables, with the first table storing the prefix (or another subset of bits) of each key and the second table storing the remainder of the key and the value field. The first table is effectively a compressed cuckoo filter, and does not consume additional storage space beyond a traditional compressed cuckoo hash table. Lookups proceed by first referencing the first table and then proceeding to check the second table if there is a match on the first table. A similar setup can be achieved via a cuckoo filter paired with a cuckoo hash table.

Figure 12:
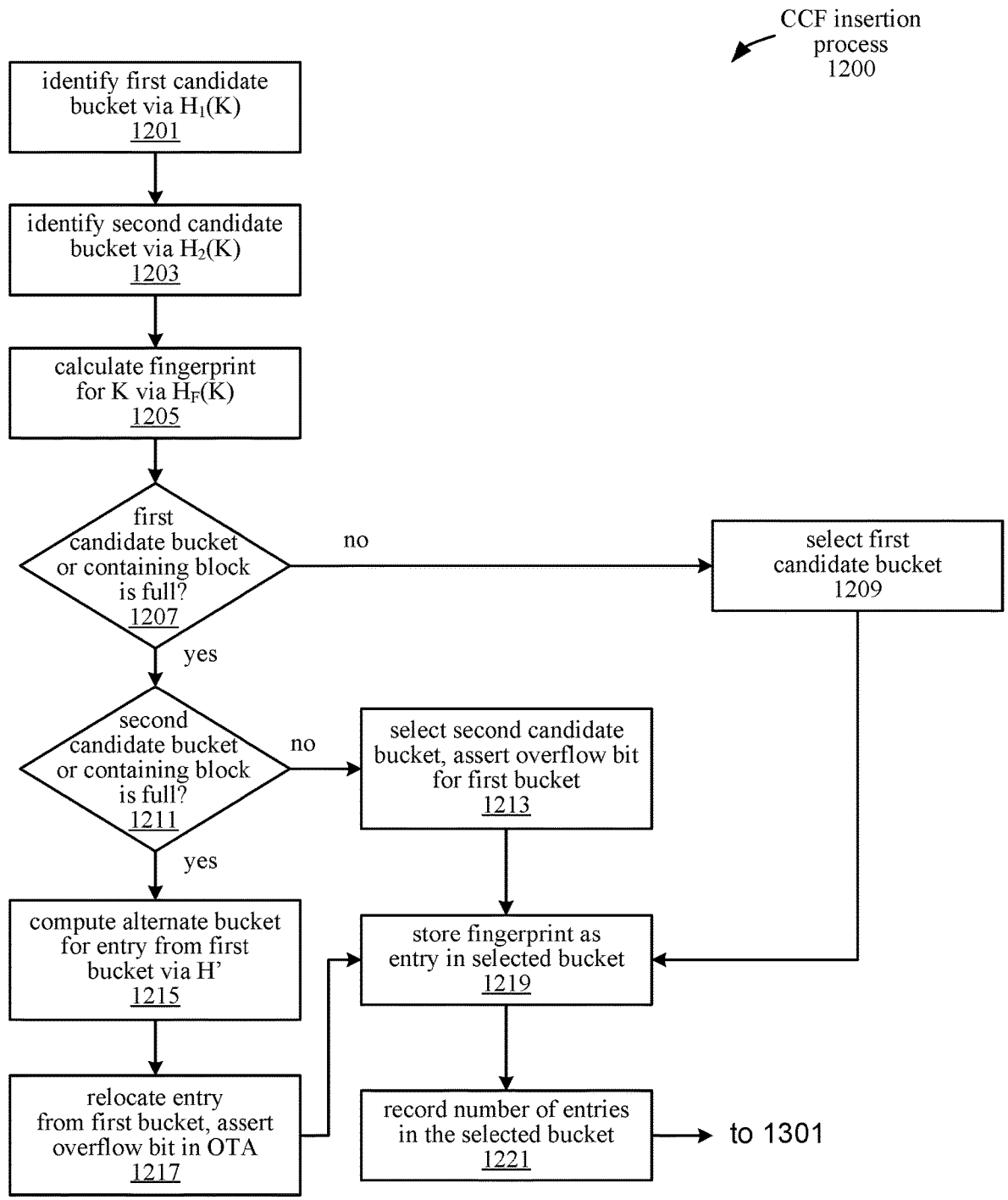
FIG. 12 is a flow diagram illustrating an insertion process in a compressed cuckoo filter, according to an embodiment.

FIG. 12 is a flow diagram illustrating a process for inserting a fingerprint into a compressed cuckoo filter (CCF), according to an embodiment. The operations in the insertion process 1200 are performed by components of the processing unit 204 and memory system 206 in computing system 200. The insertion process 1200 adds a key K to a set by calculating a fingerprint F for the key K, then adding the fingerprint F as an entry in one of two candidate buckets in the filter, performing cuckoo hashing by evicting and relocating entries as appropriate.

At block 1201, the insertion logic 306 identifies from the set of buckets in the filter a first candidate bucket for the key K by executing a first bucket hash $H_1(K)$ 304 on the key K in the hash module 301. At block 1203, the insertion logic 306 identifies from the set of buckets a second candidate bucket for the key K by executing a second bucket hash $H_2(K)$ 304 on the key K in the hash module 301. At block 1205, the insertion logic 306 also uses the hash module 301 to calculate a fingerprint F for the key K by executing a fingerprint hash $H_F(K)$ 305 on the key K.

At block 1207, the insertion logic 306 determines whether the first candidate bucket is full or the block containing the first candidate bucket is full. The first candidate bucket is full when the recorded number of entries for the first bucket (i.e., the count value 326 for the bucket from the FCA 312) has reached its maximum count value. In one embodiment, the maximum count value is the highest number that can be represented according to the bit length of the count value. The block containing the first candidate bucket is full if the block already contains the maximum number of entries. If the first candidate bucket is not full (i.e., the count value 326 for the bucket in the FCA 312 is less than the maximum count value) and the containing block is not full (i.e., the block has a free slot available for storing the fingerprint entry), then at block 1209, the insertion logic 306 selects the first candidate bucket for inserting the fingerprint F. At block 1219, the insertion logic 306 stores the fingerprint F as an entry in the selected first candidate bucket, transmitting the fingerprint 324 and indicating the location 325 in the first candidate bucket at which the fingerprint is to be inserted to the FSA 311.

At block 1207, if the first candidate bucket or its containing block is full, the insertion logic 306 evaluates whether the second candidate bucket is full or the block containing the second candidate bucket is full at block 1211. At block 1211, if the second candidate bucket is not full (i.e., its count value 326 from the FCA 312 has not reached the maximum count value) and its containing block is not full (i.e., the block includes a free slot for storing the fingerprint entry), then the second candidate bucket is selected at block 1213 for insertion of the fingerprint F. At block 1219, the insertion logic 306 stores the fingerprint F as an entry in the selected second candidate bucket, transmitting the fingerprint 324 and indicating the location 325 in the second candidate bucket at which the fingerprint is to be inserted to the FSA 311.

Since the new fingerprint is overflowed from the first candidate bucket, the overflow bit for the first candidate bucket is asserted. The insertion logic 306 calls the overflow hash $H_{OTA}$ on the overflowed first candidate bucket to compute an index 340 for its overflow bit. The overflow bit for the overflowed first candidate bucket is asserted in the OTA 310. In one embodiment, the overflow bit for the first candidate bucket is shared with other buckets grouped in the same slice as the first candidate bucket, as previously described with reference to FIGS. 9A and 9B.

At block 1211, if the second candidate bucket or its containing block is also full, then neither of the candidate buckets for the fingerprint F has an available slot for the fingerprint F to be inserted into; therefore, the insertion logic 306 calculates an alternate bucket at block 1215 for relocating one of the entries already in the first bucket. The entry to be relocated is selected to minimize the resulting number of entries displaced. In an alternative embodiment, the entry to be relocated is selected from either the first candidate bucket or the second candidate bucket. The alternate bucket is calculated by an alternate bucket hash H' 303 of the fingerprint being relocated and the bucket (i.e., the first candidate bucket) from which the fingerprint is being evicted.

In one embodiment, the bucket index of the first candidate bucket from which the entry is being evicted and the bucket index of the alternate bucket have opposite parity (as previously described with reference to FIG. 10). In one embodiment, entries in the alternate candidate bucket are located within the same page of physical memory as some or all of the entries in the first candidate bucket.

At block 1217, the insertion logic 306 relocates the fingerprint entry from the first bucket to its alternate bucket. In one embodiment, the relocation of the fingerprint entry to its alternate bucket recursively invokes another instance of blocks 1211-1221, with the alternate bucket as the second candidate bucket. After eviction of the fingerprint entry from the first candidate bucket, the first candidate bucket has an empty slot and is thus selected for storing the new fingerprint F. Since the displacement of an entry to make room for the new fingerprint entry is a bucket overflow event, the insertion logic 306 asserts the overflow bit for the overflowed first candidate bucket in the OTA 310. At block 1219, the new fingerprint F for the key K is stored in the now empty slot in the first candidate bucket.

In one embodiment the compressed cuckoo filter is part of a cuckoo hash table that stores key-value pairs as entries, rather than fingerprints. In one embodiment, the cuckoo hash table is disaggregated, such that each entry in the compressed cuckoo filter includes a first portion of a key and is associated with an entry in an auxiliary hash table containing a second portion of the key and a value for the key. In such an embodiment, the insertion logic at block 1219 stores the key portions and associated value as entries in the respective compressed cuckoo filter and auxiliary hash table.

At block 1221, the insertion logic 306 records the number of entries in the selected bucket. Since one new fingerprint entry was added to the selected bucket at block 1219, the count value for the bucket is incremented by one. The insertion logic 306 indicates the bucket index 327 to be incremented to the counter 307, which increments the appropriate count value in the FCA 312 by writing the updated number of entries in the bucket as one of the count values in the FCA 312.

Process 1200 is repeated for each of multiple keys that are added to the compressed cuckoo filter. For each of the buckets of the set of buckets in the compressed cuckoo filter, the count value for the bucket starts from zero and is incremented with each insertion of a fingerprint into its respective bucket according to block 1221. From block 1221, the process 1200 returns to block 1201 to insert additional keys, or continues to block 1301 of the lookup process 1300.

Figure 13:
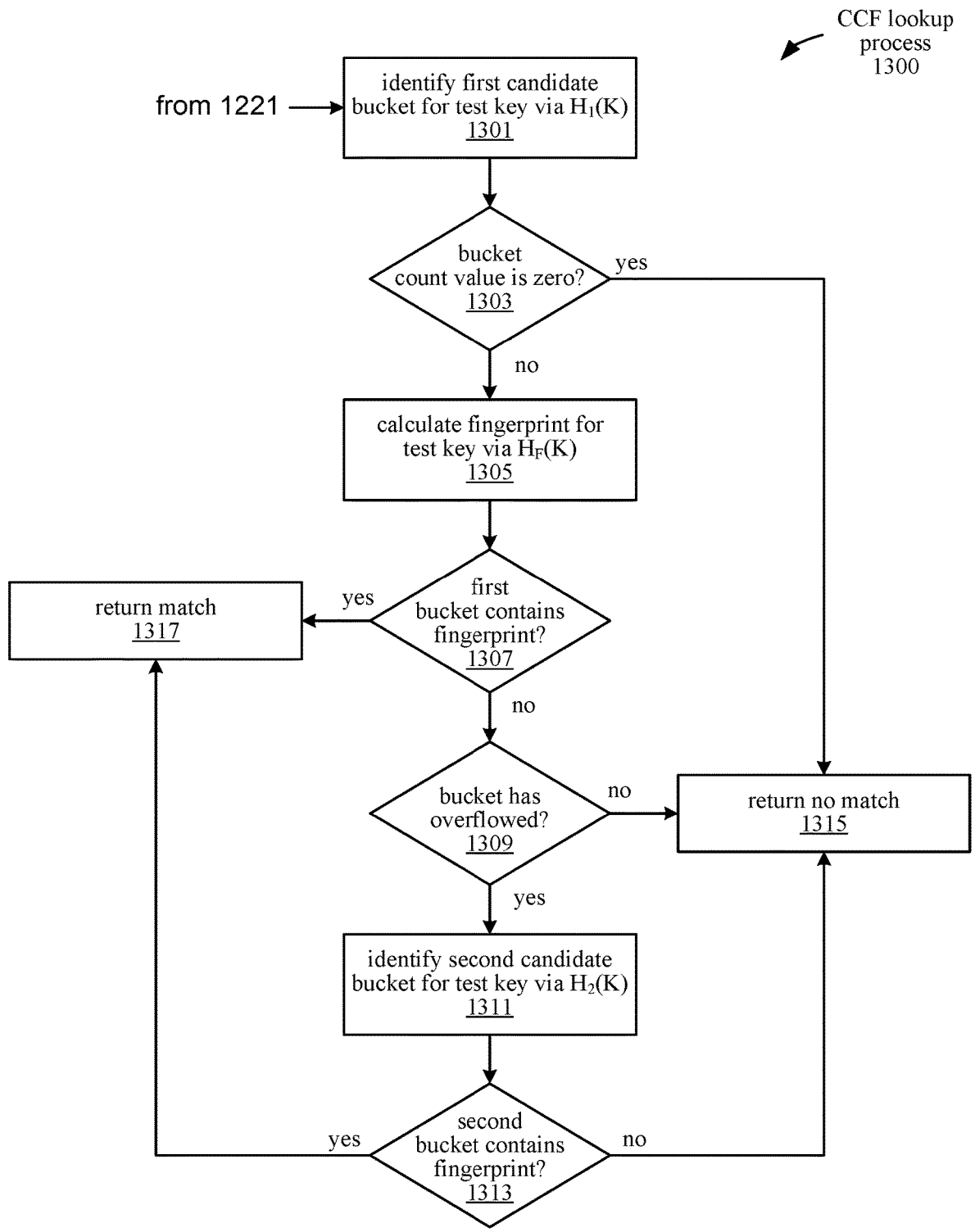
FIG. 13 is a flow diagram illustrating a lookup process in a compressed cuckoo filter, according to an embodiment.

FIG. 13 is a flow diagram illustrating the process 1300 for performing a lookup of a test key in the compressed cuckoo filter (CCF), according to an embodiment. The operations in the lookup process 1300 are performed by components of the processing unit 204 and memory system 206 in computing system 200. The lookup process 1300 generates a match result 350, where a positive match indicates that the test key has most likely been added to the filter, and a negative result indicates that the test key has not been added to the filter.

At block 1301, the lookup logic 309 identifies from the set of buckets in the filter a first candidate bucket for the test key K by executing a first bucket hash $H_1(K)$ 304 on the key K in the hash module 301. At block 1303, of the count value for the computed candidate bucket is zero, the lookup process 1300 returns a negative match result at block 1315. A zero count value indicates that the candidate bucket is empty, and thus does not contain the fingerprint for the test key.

In one embodiment where the first candidate bucket is not preferred for insertion of new fingerprints, it is possible that the fingerprint is in the second candidate bucket while the first candidate bucket is empty. Thus, in such an embodiment, the count value for the alternate bucket is also checked at block 1303, and the process 1300 returns a negative match result 350 at block 1315 when both buckets have a count value of zero.

At block 1303, if the count value for the first candidate bucket is not zero, the process 1300 continues at block 1305. At block 1305, the insertion logic 306 also uses the hash module 301 to calculate the fingerprint F for the key K by executing the fingerprint hash $H_F(K)$ 305 on the key K.

At block 1307, if the computed fingerprint F is in the first candidate bucket, the lookup logic 309 returns a positive match result 350 at block 1317, indicating that the test key is most likely in the set. In an embodiment where the compressed cuckoo filter is used in conjunction with an auxiliary hash table to implement a cuckoo hash table, the test key is matched to a key or portion of a key in the cuckoo hash table instead of to a fingerprint. A positive match result in the compressed cuckoo filter triggers an additional lookup to match a remaining portion of the key (if any) and identify a value for the key in the auxiliary hash table.

At block 1307, if the fingerprint F is not in the first candidate bucket, the lookup logic 309 evaluates at block 1309 whether the first candidate bucket has previously overflowed. The lookup logic 309 invokes the hash module 301 to compute the overflow bit index 340 for the first candidate bucket using the overflow hash function 302, then checks the overflow bit 341 for the bucket. If the overflow bit 341 is not asserted, the first candidate bucket has not previously overflowed. Accordingly, since the first candidate bucket does not contain the fingerprint and no overflow event occurred that would have placed the fingerprint in another bucket, the lookup logic 309 returns a negative match result at block 1315.

At block 1309, if the overflow bit for the first candidate bucket is asserted, then the first candidate bucket has possibly overflowed (a false positive can occur due to hash collision, or overflows in other buckets in the same slice). At block 1311, the lookup logic 309 identifies from the set of buckets a second candidate bucket for the test key K by executing a second bucket hash $H_2(K)$ 304 on the test key K in the hash module 301.

At block 1313, the lookup logic 309 determines whether the second candidate bucket contains the fingerprint previously calculated for the test key. The lookup logic 309 compares the fingerprint with each entry in the second candidate bucket until a match is found or until all of the entries have been compared without matching. If the fingerprint is found in the second candidate bucket, the lookup logic 309 returns a positive match result 350 at block 1317. If the fingerprint is not found in the second candidate bucket, the lookup logic 309 returns a negative match result 350 at block 1315. The process for deleting a fingerprint from the compressed cuckoo filter includes similar operations as the lookup process 1300, except that the fingerprint is deleted after being found in the first candidate bucket or second candidate bucket, and the count value for the bucket is decremented in the FCA 312.

Figure 14:
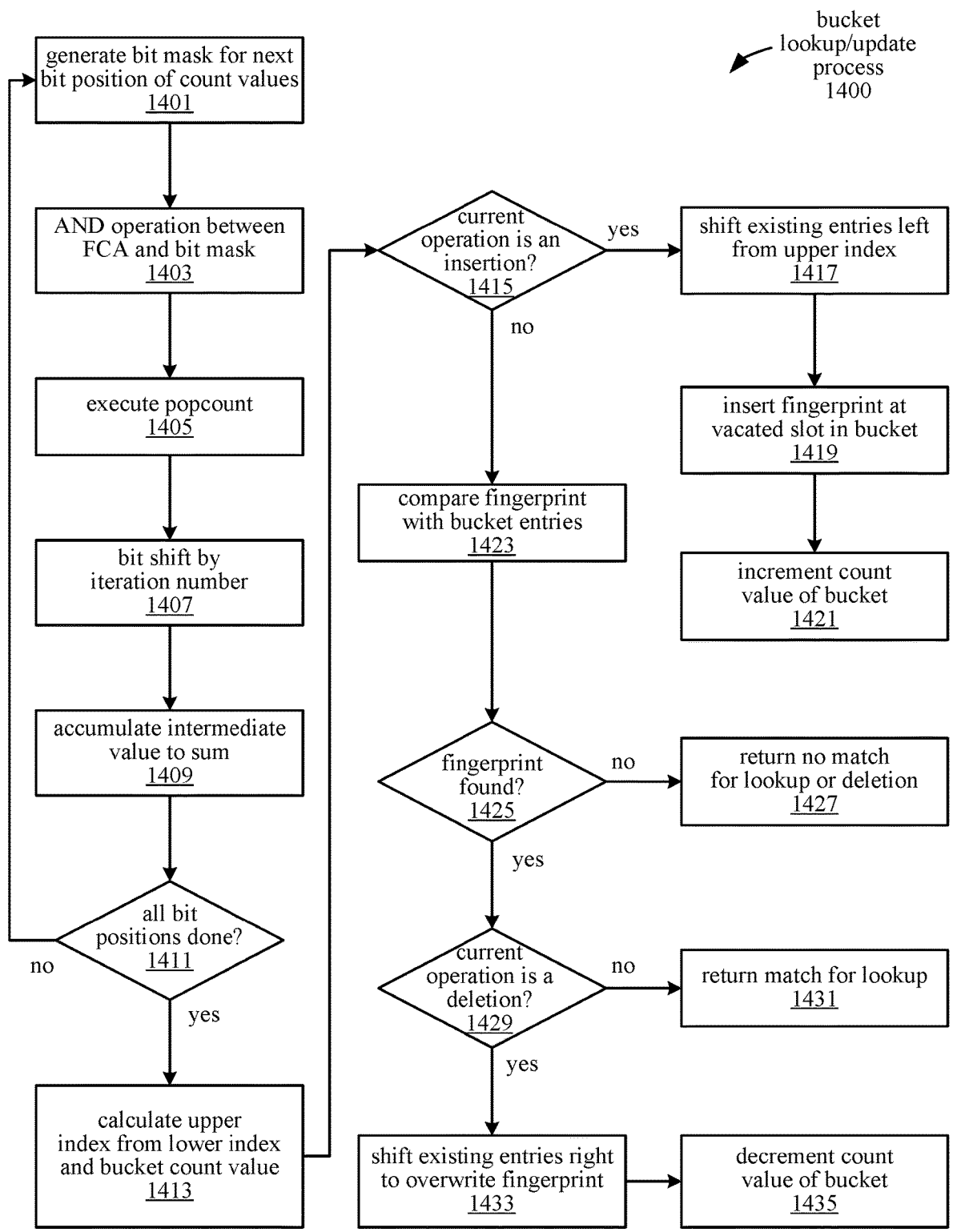
FIG. 14 is a flow diagram illustrating bucket-level operations in a compressed cuckoo filter, according to an embodiment.

FIG. 14 is a flow diagram illustrating a process 1400 for performing lookup, insertion, and deletion operations at the bucket level in a compressed cuckoo filter, according to an embodiment. The operations in the process 1400 are performed by components of the processing unit 204 and memory system 206 in computing system 200. FIG. 14 illustrates in more detail the operations taking place during portions of processes 1200 and 1300. For example, process 1400 is performed within the insertion process 1200 at block 1219 and within the lookup process 1300 at blocks 1307 and 1313.

For a bucket level lookup or update, the arithmetic logic unit (ALU) 308 calculates the bounds of the bucket as defined by upper and lower storage array indexes, which are calculated as provided in blocks 1401-1413. With reference to FIGS. 6A and 6B, in order to calculate the upper storage array index for the bucket, consecutive count values 602 in the FCA 603 are summed, where each of the consecutive count values 602 has an index in the FCA 603 for the block that is lower than an index 601 of the count value for the bucket of interest. Blocks 1401-1411 are performed in a loop, with one iteration numbered n performed for each bit position in the maximum bit width w of the count values in the FCA 603, where n is an integer from 0 to w-1.

At block 1401, a bit mask 604 is generated for the next bit position in the bit width w. For the first iteration number n=0, the next bit position is bit 0. Therefore, the bit mask 604 has the '0' bit positions asserted for each of the count values 602 and the remaining bit positions in the FCA 603 deasserted. At block 1403, the ALU 308 performs a bitwise AND operation 605 between the FCA 603 and the bit mask 604. The 'popcount' instruction 606 is executed on the result at block 1405 to count the number of asserted bits in the nth bit positions of the count values 602. At block 1407, the result of the 'popcount' is bit shifted 607 to the left by n bit positions. For the first iteration number n=0, the 'popcount' result is shifted by 0 places.

At block 1409, the bit shifted result (i.e., intermediate value 608) is accumulated to a sum via an addition operation 609. At block 1411, if all of the w bit positions have not been processed, the process 1400 returns to 1401 for the next bit position. Continuing the previous example, the blocks 1401-1411 are repeated for n=1.

At block 1411, if all of the w bit positions have been processed, the final accumulated sum is the sum of the count values 602, which is the lower storage array index. The intermediate values 608 calculated from the w iterations of blocks are thus added together to calculate the lower storage array index. In the example illustrated in FIGS. 6A and 6B, the lower storage array index is '3'.

At block 1413, the ALU 308 calculates the upper storage array index by adding one less than the count value corresponding to the selected bucket to the lower storage array index. Continuing the previous example, one less than the selected bucket's count value is 3−1, or 2; therefore, the upper storage array index is 2+3, or 5. The lower and upper storage array indexes are the indexes in the FSA of the first and last of the entries in the selected bucket.

At block 1415, if the current operation is an insertion, the process 1400 continues at block 1417. With reference to FIGS. 7A and 7B, existing entries in the FSA 704 having a higher index than the upper storage array index are shifted one place to the left to free a slot at the insertion index 701 for a new entry to be inserted, as provided at block 1417. At block 1419, the new fingerprint entry $F_y$ is inserted at the vacated slot at the insertion index 701. Accordingly, the count value for the selected bucket is incremented to reflect the addition of the new entry to the bucket.

At block 1415, if the current operation is not an insertion, then the current operation is a lookup or a deletion operation that is associated with a test key and its associated fingerprint entry to be looked up in the selected bucket, or deleted from the selected bucket. At block 1423, the lookup logic 309 compares the fingerprint with one or more entries in the selected bucket. The entries in the selected bucket are identified in the FSA 704 as having indexes in the FSA 704 equal to or in between the upper and lower storage array indexes for the selected bucket.

At block 1425, if the fingerprint does not match any of the entries in the selected bucket, the lookup logic 309 at block 1427 returns a negative match result 350 indicating that the fingerprint could not be found for the lookup or deletion operation. At block 1425, if the fingerprint matches at least one of the entries in the selected bucket, the process 1400 continues at block 1429. At block 1429, if the current operation is not a deletion, then the current operation is a lookup operation. Accordingly, at block 1431, the lookup logic 309 returns a positive match for the lookup operation, indicating that the fingerprint was found and the test key is likely in the set.

At block 1429, if the current operation is a deletion operation, then the process 1400 continues at block 1433. Referring to FIGS. 8A and 8B, at block 1433, the entries in the FSA 704 to the left of the fingerprint $F_y$ to be deleted are shifted by one place to the right so that the fingerprint $F_y$ is overwritten. At block 1435, the count value for the selected bucket is decremented by one to reflect the successful deletion of the fingerprint entry $F_y$.

Insertions, lookups, and deletions are thus performed on a compressed cuckoo filter according to processes 1200, 1300, and 1400. These operations allow in-situ reads and updates to be performed directly on the compressed representation; accordingly, the compressed cuckoo filter (or other bucketized filter utilizing similar principles) is able to achieve faster speeds for lookups, insertions, and deletions while reducing the overall amount of storage space consumed.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 200 and/or portions thereof carried on the computer-readable storage medium may be a database or other data structure which can be read by a program and used, directly or indirectly, to fabricate the hardware including the computing system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 200. The netlist may then be placed and routed to produce a data set describing geometric shapes to be applied to masks. The masks may then be used in various semiconductor fabrication steps to produce a semiconductor circuit or circuits corresponding to the computing system 200. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   for each key of a plurality of keys:

identifying, from a set of buckets, a first bucket for the key based on a first hash function and a second bucket for the key based on a second hash functions; and storing an entry for the key in a selected bucket selected from one of the first bucket and the second bucket by inserting the entry in a sequence of entries in a memory block, wherein a position of the entry in the sequence of entries corresponds to the selected bucket;

for each bucket in the set of buckets, recording, in a data structure, an indication of a respective number of entries in a corresponding bucket; and in response to the storing of the entry in the selected bucket, updating the indication of the respective number of entries in the selected bucket.

2. The method of claim 1, further comprising:

for each key of the plurality of keys, calculating a fingerprint for the key based on a fingerprint hash function, wherein the entry for the key in the sequence of entries comprises the fingerprint; and storing the sequence of entries at contiguous locations in the memory block.

3. The method of claim 1, wherein:

the data structure comprises a fullness counter array;

for each bucket in the set of buckets, the recording comprises writing, to the memory block, a respective count value in the fullness counter array; and the count values in the fullness counter array are ordered according to a sequential order of the set of buckets.

4. The method of claim 3, further comprising:

identifying the selected bucket for a test key based on executing the first hash function on the test key;

calculating a lower storage array index for the selected bucket by summing consecutive count values from the fullness counter array, wherein each of the consecutive count values has an index in the fullness counter array that is lower than an index in the fullness counter array of the count value corresponding to the selected bucket;

calculating an upper storage array index for the selected bucket by adding one less than the count value corresponding to the selected bucket to the lower storage array index of the selected bucket; and comparing an entry corresponding to the test key with one or more of entries each having an index in a storage array equal to or between the lower storage array index and the upper storage array index.

5. The method of claim 4, wherein summing the consecutive count values comprises summing a plurality of intermediate values each calculated by:

counting a number of asserted bits in nth bit positions of the consecutive count values; and left bit shifting the number of asserted bits by n places, wherein n is an integer from 0 to one less than a maximum bit width of the consecutive count values.

6. The method of claim 3, further comprising:

in response to determining that the first bucket is full and the second bucket has an empty slot;

selecting the second bucket as the selected bucket; and incrementing in the fullness counter array the count value corresponding to the second bucket in response to storing the entry for the key in the second bucket; and in response to determining that both the first bucket and the second bucket are full, selecting the first bucket as the selected bucket after relocating another entry from the first bucket.

7. The method of claim 6, further comprising:

determining that the first bucket is full when the indication of the respective number of entries for the first bucket reaches a maximum count value;

in response to determining that the first bucket is full, asserting an overflow bit corresponding to the first bucket in an overflow tracking array;

identifying the first bucket as a candidate bucket for a test key based on executing the first hash function on the test key; and in response to determining that the overflow bit for the first bucket is asserted, comparing an entry corresponding to the test key with one or more entries in a bucket from the set of buckets other than the first bucket.

8. The method of claim 1, further comprising, for a first key of the plurality of keys relocating an entry for the first key from the first bucket to a third bucket of the set of buckets by executing an alternate bucket function on a bucket index of the first bucket and on the first key to calculate a bucket index of the third bucket, wherein:

the bucket index of the first bucket and the bucket index of the third bucket have opposite parity; and one or more entries in the first bucket are stored in a same memory page as one or more entries in the third bucket.

9. The method of claim 1, further comprising:

identifying, from the set of buckets, first candidate bucket for a test key based on executing the first hash function on the test key;

identifying, from the set of buckets, a second candidate bucket for the test key based on executing the second hash function on the test key; and in response to determining that a count value for at least one of the first candidate bucket and the second candidate bucket is zero, indicating that a fingerprint for the test key is absent.

10. The method of claim 1, wherein:

for each key of the plurality of keys, the entry for the key in the sequence of entries comprises a first portion of the key, and the method further comprises:

for each key of the plurality of keys, associating a second portion of the key with a value for the key in an auxiliary hash table; and in response to matching a test key with a matching entry in the sequence of entries, identifying a value corresponding to the matching entry in the auxiliary hash table.

11. A computing device, comprising:

a hash module configured to, for each key of a plurality of keys:

calculate a first hash of a key to identify, from a set of buckets, a first candidate bucket for the keys; and calculate a second hash of the key to identify, from the set of buckets, a second candidate bucket for the key;

an insertion logic module coupled with the hash module and configured to, for each key in the plurality of keys;

store an entry for the key in a selected bucket selected from one of the first candidate bucket and the second candidate bucket by inserting the entry in a sequence of entries in a memory block, wherein a position of the entry in the sequence of entries corresponds to the selected bucket; and a counter coupled with the insertion logic module and configured to:

for each bucket in the set of buckets, record, in a data structure, an indication of a respective number of entries in a corresponding bucket; and in response to the storing of the entry in the selected bucket, update the indication of the respective number of entries in the selected bucket.

12. The computing device of claim 11, wherein:
the hash module is further configured to, for each key of the plurality of keys, calculate a fingerprint for the key based on a fingerprint hash function, wherein the entry for the key in the sequence of entries comprises the fingerprint; and
the insertion logic module is further configured to store the sequence of entries at contiguous locations in the memory block.

13. The computing device of claim 11, wherein:
the data structure comprises a fullness counter array;
the counter is further configured to, for each bucket in the set of buckets, record the indication of the respective number of entries in the corresponding bucket by writing a count value in the fullness counter array; and
the count values in the fullness counter array are ordered according to a sequential order of the set of buckets.

14. The computing device of claim 13, wherein:
the hash module is configured to identify the selected bucket for a test key based on executing a first hash function on the test key; and
the computing device further comprises:
an arithmetic logic unit coupled with the hash module and configured to:
calculate a lower storage array index for the selected bucket by summing consecutive count values from the fullness counter array, wherein each of the consecutive count values has an index in the fullness counter array that is lower than an index in the fullness counter array of the count value corresponding to the selected bucket; and
calculate an upper storage array index for the selected bucket by adding one less than the count value corresponding to the selected bucket to the lower storage array index of the selected bucket; and
a lookup logic coupled with the arithmetic logic unit and configured to compare an entry corresponding to the test key with one or more of entries each having an index in a storage array equal to or between the lower storage array index and the upper storage array index.

15. The computing device of claim 11, wherein:
the insertion logic module is configured to:
in response to determining that the first candidate bucket is full and the second candidate bucket has an empty slot, select the second candidate bucket as the selected bucket, and
in response to determining that both of the first candidate bucket and the second candidate bucket are full, select the first candidate bucket as the selected bucket after relocating another entry from the first candidate bucket; and
the counter is configured to, in response to determining that the first candidate bucket is full and the second candidate bucket has the empty slot, increment in the fullness counter array the count value corresponding to the second candidate bucket in response to storing the entry for the key in the second candidate bucket.

16. The computing device of claim 11, wherein:
the hash module is configured to:
identify, from the set of buckets, the first candidate bucket for a test key based on executing a first hash function on the test keys; and
identify, from the set of buckets, the second candidate bucket for the test key based on executing a second hash function on the test key; and
the computing device further comprises a lookup logic configured to, in response to determining that a count value for at least one of the first candidate bucket and the second candidate bucket is zero, indicate that a fingerprint for the test key is absent.

17. A computing system, comprising:
a storage array configured to store a sequence of entries;
a counter array configured to store a count value for each bucket in a set of buckets;
a hash module configured to, for each key of a plurality of keys:
calculate a first hash of the key to identify, from the set of buckets, a first candidate bucket for the keys; and
calculate a second hash of the key to identify, from the set of buckets, a second candidate bucket for the key;
an insertion logic module coupled with the hash module and configured to, for each key in the plurality of keys, store an entry for the key in a selected bucket selected from one of the first candidate bucket and the second candidate bucket by inserting the entry for the key in a sequence of entries, wherein a position of the entry for the key in the sequence of entries corresponds to the selected bucket; and
a counter module coupled with the counter array and configured to:
for each bucket of the set of buckets, record, in the counter array, an indication of a respective number of entries in a corresponding bucket as the count value for the corresponding bucket; and
in response to the storing of the entry in the selected bucket, update the indication of the respective number of entries in the selected bucket.

18. The computing system of claim 17, wherein:
the count values in the counter array are ordered according to a sequential order of the set of buckets; and
the insertion logic module is further configured to store the sequence of entries at contiguous locations in the storage array.

19. The computing system of claim 17, wherein:
the hash module is configured to identify the selected bucket for a test key based on executing a first hash function on the test key; and
the computing system further comprises:
an arithmetic logic unit coupled with the hash module and configured to:
calculate a lower storage array index for the selected bucket by summing consecutive count values from the counter array, wherein each of the consecutive count values has an index in the counter array that is lower than an index in the counter array of the count value corresponding to the selected bucket; and
calculate an upper storage array index for the selected bucket by adding one less than the count value corresponding to the selected bucket to the lower storage array index, and
a lookup logic coupled with the arithmetic logic unit and configured to compare an entry corresponding to the test key with one or more of entries each having an index in the storage array equal to or between the lower storage array index and the upper storage array index.

20. The computing system of claim 17, wherein:
the insertion logic module is configured to:

in response to determining that the first candidate bucket is full and the second candidate bucket has an empty slot, select the second candidate bucket as the selected bucket; and in response to determining that both of the first candidate bucket and the second candidate bucket are full, select the first candidate bucket as the selected bucket after relocating another entry from the first candidate bucket; and the counter module is further configured to, in response to determining that the first candidate bucket is full and the second candidate bucket has the empty slot, increment, in the counter array, the count value corresponding to the second candidate bucket in response to storing the entry for the key in the second candidate bucket.

* * * * *